(12) United States Patent
Bonhote et al.

(10) Patent No.: US 7,950,137 B2
(45) Date of Patent: May 31, 2011

(54) METHOD FOR MANUFACTURING A MAGNETIC WRITE HEAD

(75) Inventors: Christian Rene Bonhote, San Jose, CA (US); Thomas Dudley Boon, Jr., San Jose, CA (US); Ming Jiang, San Jose, CA (US); Jordan Asher Katine, Mountain View, CA (US); Quang Le, San Jose, CA (US); Yinshi Liu, Foster City, CA (US); Xhavin Sinha, New Westminister (CA); Sue Siyang Zhang, Saratoga, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 957 days.

(21) Appl. No.: 11/766,711

(22) Filed: Jun. 21, 2007

(65) Prior Publication Data

US 2008/0316652 A1    Dec. 25, 2008

(51) Int. Cl.
*G11B 5/127* (2006.01)
*H04R 31/00* (2006.01)

(52) U.S. Cl. ............... 29/603.16; 29/603.13; 29/603.14; 29/603.15; 29/603.18; 205/119; 205/122; 360/121; 360/122; 360/317; 451/5; 451/41

(58) Field of Classification Search ............... 29/603.07, 29/603.13–603.16, 603.18; 205/119, 122; 360/121, 122, 317; 451/5, 41
See application file for complete search history.

(56) References Cited

U.S. PATENT DOCUMENTS

| | | | |
|---|---|---|---|
| 6,710,973 B2 | 3/2004 | Okada et al. | 360/125 |
| 6,954,340 B2 | 10/2005 | Shukh et al. | 360/317 |
| 7,002,775 B2 | 2/2006 | Hsu et al. | 360/125 |
| 7,031,121 B2 | 4/2006 | Khera et al. | 360/317 |
| 7,075,756 B1 | 7/2006 | Mallary et al. | 360/317 |
| 2004/0218312 A1 | 11/2004 | Matono | 360/317 |
| 2005/0118329 A1 | 6/2005 | Kamijima | 427/127 |
| 2005/0128637 A1 | 6/2005 | Johnston et al. | 360/125 |

(Continued)

FOREIGN PATENT DOCUMENTS

| | | | |
|---|---|---|---|
| JP | 56022206 | | 3/1981 |
| JP | 58012121 | | 1/1983 |
| JP | 04152514 A | * | 5/1992 |
| JP | 2004/127480 | | 4/2004 |
| JP | 2005/108348 | | 4/2005 |

OTHER PUBLICATIONS

Kanai et al, "Recording Field Analysis of Narrow-Track SPT Head With Side Shields, Tapered Main Pole, and Tapered Return Path for 1 Tb/in$^2$" IEEE Transactions on Magnetics, vol. 39, No. 4, Jul. 2003.

(Continued)

*Primary Examiner* — Paul D Kim
(74) *Attorney, Agent, or Firm* — Zilka-Kotab, PC

(57) ABSTRACT

A method for manufacturing a write pole for perpendicular magnetic recording for accurately defining a side shield throat height and write pole flare point. The magnetic structure includes a write pole portion and first and second side shield portions. The side shields portions are magnetically connected with the write pole portion in a region in front of an intended air bearing surface plane (e.g. in the direction from which lapping will progress). The side shields portions are each separated from the write pole portion in a region behind the intended air bearing surface plane by notches that terminate at a desired location relative to the intended air bearing surface plane and which open up in a region behind the intended air bearing surface plane.

9 Claims, 37 Drawing Sheets

U.S. PATENT DOCUMENTS

| | | | |
|---|---|---|---|
| 2005/0141137 A1 | 6/2005 | Okada et al. | 360/122 |
| 2005/0219752 A1 | 10/2005 | Takahashi | 360/126 |
| 2006/0098338 A1 | 5/2006 | Watabe et al. | 360/126 |
| 2006/0139802 A1 | 6/2006 | Sasaki et al. | 360/126 |
| 2006/0198047 A1 | 9/2006 | Xue et al. | 360/126 |
| 2008/0253035 A1* | 10/2008 | Han et al. | 360/319 |

OTHER PUBLICATIONS

Mallary et al., "One Terabit per Square Inch Perpendicular Recording Conceptual Design" IEEE Transactions on Magnetics, vol. 38, No. 4, Jul. 2002.

* cited by examiner

METHOD FOR MANUFACTURING A MAGNETIC WRITE HEAD

FIELD OF THE INVENTION

The present invention relates to perpendicular magnetic recording and more particularly to the formation of a perpendicular magnetic write head with a self aligned side and trailing shield.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, referred to as a spacer layer, sandwiched between first and second ferromagnetic layers, referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos\theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction substantially perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

In order to increase field gradient and decrease side writing, some perpendicular recording systems have been configured with trailing magnetic shield and with side magnetic shields. However, certain dimensions of such shields, such as the shield throat height (i.e. distance from the ABS to the back edge of the shield) should be carefully controlled. What's more, an optimal throat height of the side shields might be different from that of the trailing shield. In addition, the location of the write pole flare point relative to the ABS is also a critical dimension to writer performance. However, as the size of such write heads becomes ever smaller, the ability to control these dimension (such as the throat height, and write pole flare point) becomes ever more difficult. For example, the throat height of the side and trailing shields can is defined by a lapping process which removes material from the front end of the write head to form the Air Bearing Surface (ABS). Such lapping processes are, however, difficult to control with great accuracy, making accurate control of the throat heights of the trailing shield and sides shields difficult to achieve.

Therefore, there is a need for a write head design, and method for manufacturing such a write head, that can allow the critical dimensions (such as shield throat height or write pole flare point) to be accurately controlled. Such a design and method would preferably be compatible with currently applied lapping processes and would allow for the accurate control of such lapping processes.

SUMMARY OF THE INVENTION

The present invention provides a method for manufacturing a write pole for perpendicular magnetic recording and for accurately defining a side shield throat height and write pole flare point. The method includes the formation of a magnetic structure that provides an electronic lapping guide as well as providing the structure for both the side shields and the write pole.

The magnetic structure includes a write pole portion and first and second side shield portions. The side shield portions are magnetically connected with the write pole portion in a region in front of an intended air bearing surface plane (e.g. in the direction from which lapping will progress). The side shields portions are each separated from the write pole portion in a region behind the intended air bearing surface plane by notches that terminate at a desired location relative to the intended air bearing surface plane and which open up in a region behind the intended air bearing surface plane. By measuring a voltage or resistance change across the magnetic structure during lapping, the magnetic structure provides a lapping guide as well as providing structure for defining the write pole and side shields.

The method can also be used to construct a write pole having non-magnetic bump formed over the write pole. This non-magnetic bump can be used to form a trailing shield that has a desirable throat height size, while also having increased thickness in a region away from the write pole so as to minimize magnetic saturation of the trailing shield and also prevent the trailing shield from robbing too much flux from the write pole.

The method can also be used to construct a write pole having a stitched magnetic pole formed over the write pole, the stitched magnetic pole can be used to provide a secondary flare point located closer to the ABS, and with better flare point control, than would be possible with a standard flare point defined by the write pole itself.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
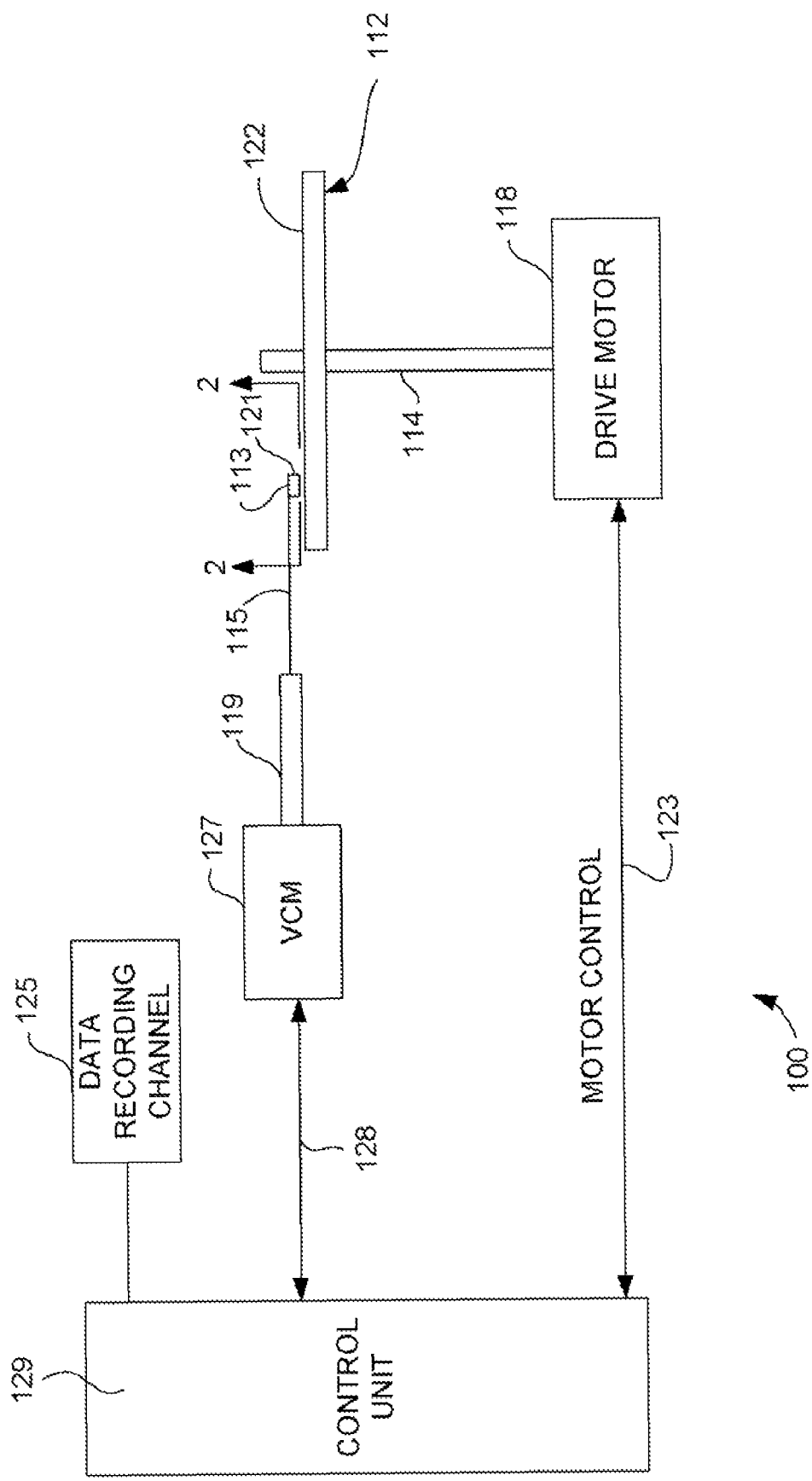
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk, surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
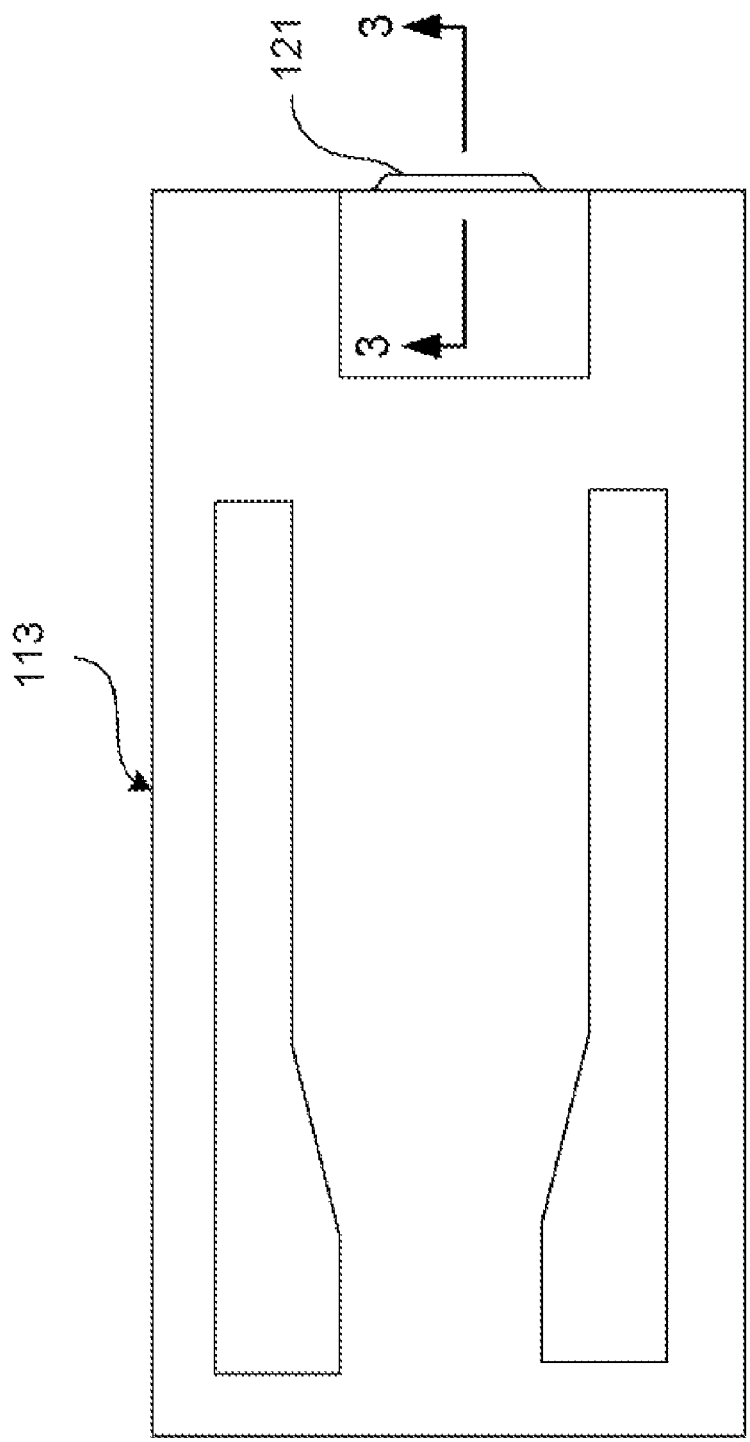
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
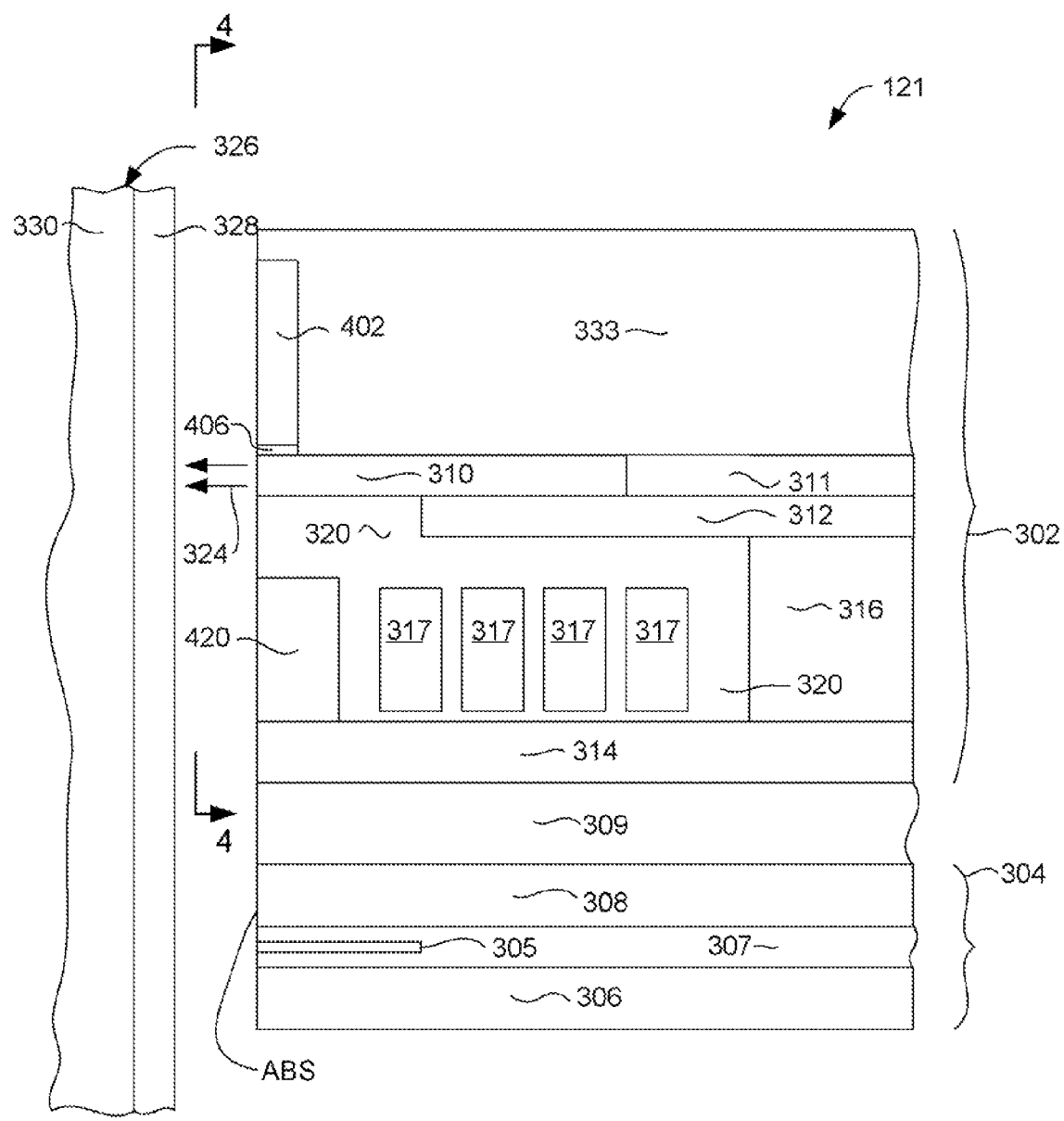
FIG. 3 is a cross sectional view, taken from line 3-3 of FIG. 2 and rotated 90 degrees counterclockwise, of a magnetic head according to an embodiment of the present invention.

With reference now to FIG. 3, a magnetic head 121 for use in a perpendicular magnetic recording system is described. The head 121 includes a write element 302 and a read element 304. The read element includes a magnetoresistive sensor 305, such as a current in plane giant magnetoresistive (CIP GMR) sensor. However, the sensor 305 could be another type of sensor such as a current perpendicular to plane (CPP) GMR sensor or, a tunnel junction sensor (TMR) or some other type of sensor. The sensor 305 is located between and insulated from first and second magnetic shields 306, 308 and embedded in a dielectric material 307. The magnetic shields 306, 308, which can be constructed of for example CoFe or NiFe, absorb magnetic fields such as those from up-track or down track data signals, ensuring that the read sensor 305 only detects the desired data bit located between the shields 306, 308. A non-magnetic, electrically insulating gap layer 309 may be provided between the shield 308 and the write head 302.

Figure 4:
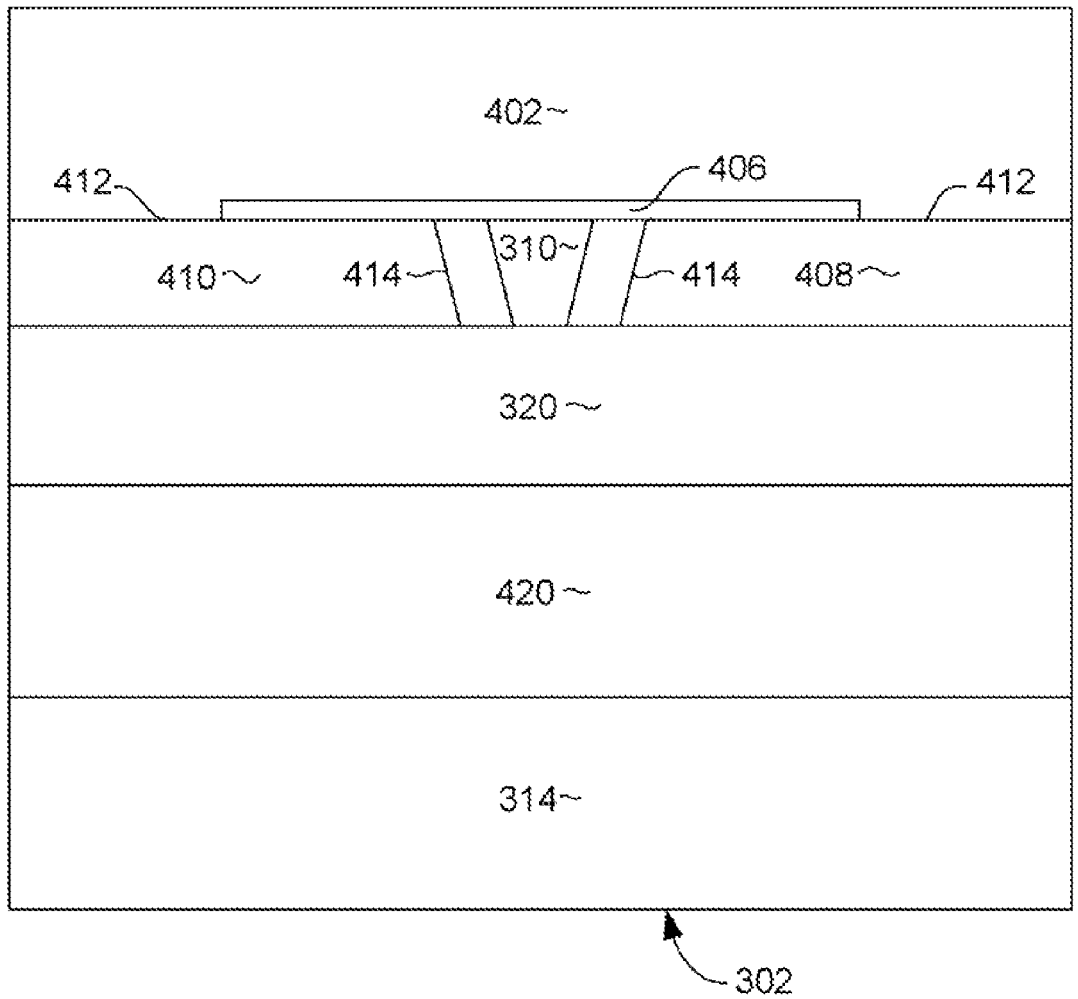
FIG. 4 is an ABS view a write head according to an embodiment of the invention.

With continued reference to FIG. 3, the write element 302 includes a write pole 310 that is magnetically connected with a magnetic shaping layer 312, and is embedded within an insulation material 311. The write pole 310 has a small cross section at the air bearing surface (as seen in FIG. 4) and is constructed of a material having a high saturation moment, such as NiFe or CoFe. The write pole 310 could be constructed as a lamination of layers of magnetic material separated by thin layers of non-magnetic material. The write element 302 also has a return pole 314 that has a surface exposed at the ABS and has a cross section parallel with the ABS surface that is much larger than that of the write pole 310. The return pole 314 is magnetically connected with the shaping layer 312 by a back gap portion 316. The shaping layer 312, return pole 314 and back gap 316 can be constructed of, for example, NiFe, CoFe or some other magnetic material.

An electrically conductive write coil 317, shown in cross section in FIG. 3, passes through the write element 302 between the shaping layer 312, and the return pole 314. The write coil 317 is surrounded by an electrically insulating material 320 that electrically insulates the turns of the coil 317 from one another and electrically isolates the coil 317 from the surrounding magnetic structures 310, 312, 316, 314. The insulation layers 320 can be constructed of a material such as alumina ($Al_2O_3$) or can be constructed as various layers of the same or different electrically insulating, non-magnetic materials. The coil 317 can be a pancake coil that wraps around the back gap 316, or could be a helical coil having an additional set of turns (not shown in FIG. 3) that extend over the write pole 310 and shaping layer 312 as will be described below with reference to FIGS. 5 and 33. A non-magnetic protective layer 333, constructed of, for example, alumina may be provided over the top of the magnetic head portion 121 to protect the structure of the head 121 from damage.

When a current passes through the coil 317, the resulting magnetic field causes a magnetic flux to flow through the return pole 314, back gap 316, shaping layer 312 and write pole 310. This magnetic flux causes a magnetic write field 324 to be emitted toward an adjacent magnetic medium 326. The magnetic medium 326 includes a thin, magnetically hard top layer 328 and a magnetically soft under-layer 330. The write field 324 locally magnetizes the magnetically hard top layer and then travels through the magnetically soft under layer to return to the return pole 314, thereby completing a magnetic circuit.

With reference to FIG. 4, a trailing shield 402 is formed adjacent to the trailing edge 404 of the write pole 310. The trailing shield 402 is constructed of a magnetic material such as NiFe and is separated from the write pole 310 by a non-magnetic trailing gap 406. The write head 302 also includes first and second side shields 408, 410, formed adjacent to the sides of the write pole 310 and which are separated from the sides of the write pole 310 by first and second non-magnetic side gaps 414. The side gaps 414 can be constructed of a material that is either the same as or different than the trailing gap 406, and can have a thickness that is different than that of the trailing gap 406. The side shields 408, 410 may be stitched to the trailing shield 402 at outer portions 412 as shown, or could be completely magnetically disconnected from the trailing shield 402.

Figure 5:
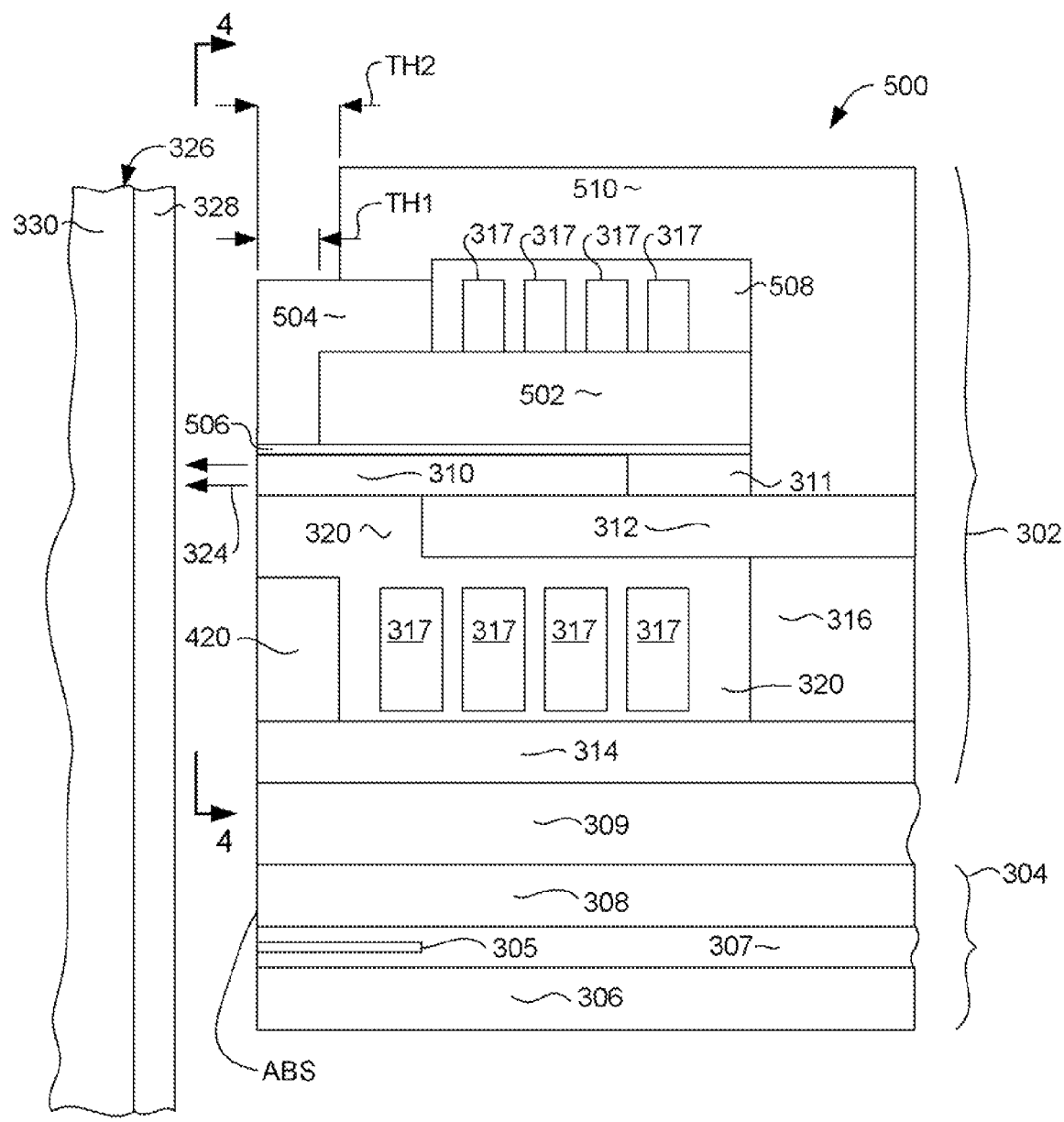
FIG. 5 is a cross sectional view of a magnetic head according to an alternate embodiment of the invention.

With reference to FIG. 5 an alternate embodiment of a magnetic head 500 includes a non-magnetic bump 502 formed over the write pole 310. The head 500 also includes a trailing shield 504 that can extend over a portion of the non-magnetic bump 502. A non-magnetic trailing gap layer 506 extends between the trailing shield 504 and the write pole 310, and can also between the non-magnetic bump 502 and the write pole 310.

The write head 502 can be configured with a helical coil 317 having a set of coil leads that extend below (leading) the write pole 310 and a set of coil leads that are formed above (trailing) the write pole 310. The upper turns of the coil 317 can be embedded in an insulation layer 508. The write head 502 can also be configured with a trailing return pole 510 that can magnetically connect the trailing shield 504 with the shaping layer 312 and back gap 316.

A benefit of the non-magnetic bump 502 is that it allows the trailing shield 504 to be constructed in such a manner as to avoid magnetic saturation of the trailing shield 504, while also providing a desired throat height TH1 adjacent to the write pole 310. The bump 504 allows the trailing shield 504 to maintain a desired throat height TH1 in a region near the write pole 310, while allowing the trailing shield 504 to have a much larger throat height TH2 in a region removed from the write pole. Because the larger throat height TH2 is in a region removed from the write pole 310, this larger throat height of the shield 504 does not cause the shield to steal flux from the write pole 310. However, it does prevent the trailing shield 504 from becoming magnetically saturated. The larger throat height TH2 also provides a larger surface for the trailing return pole 510 to contact the trailing shield 504.

Figure 32:
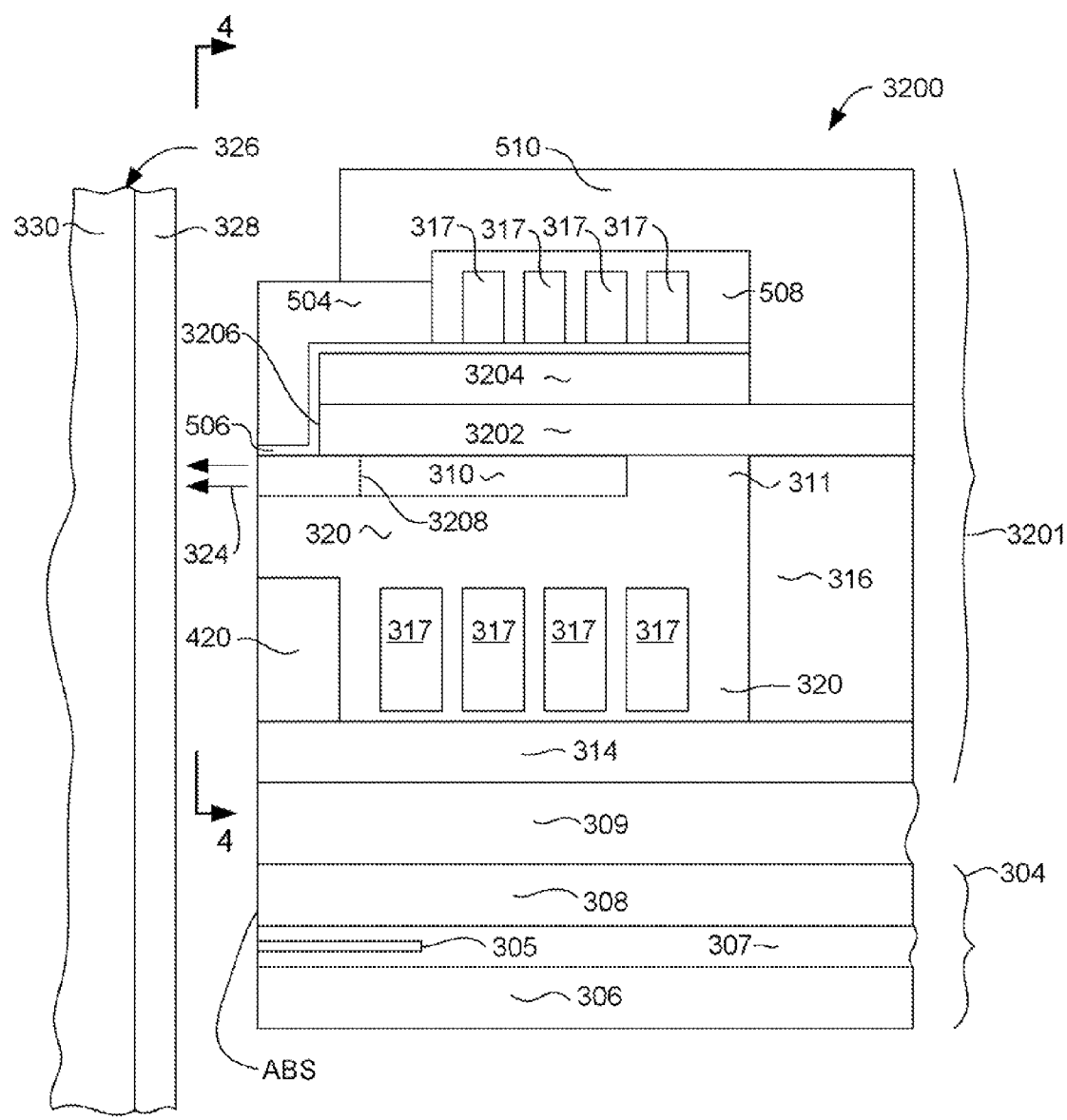
FIG. 32 is a cross sectional view of a magnetic head according to an embodiment of the invention.

With reference now to FIG. 32, another possible embodiment of the invention is shown. This embodiment includes a magnetic head 3200 that includes a write head 3201 having a stitched pole 3202 that is magnetically connected with the write pole 310 and which provides a secondary flare point defined by the end of the stitched pole 3202. The write pole 310 has a flare point indicated by the dashed line 3208, which is the point at which the write pole 310 flares laterally outward (out of the plane of the page in FIG. 32). Although the flare point of a write head is an important parameter to sensor performance, at very small write head sizes the location of this flare point can be difficult to accurately control. The presence of the stitched pole 3202 solves this problem by providing a secondary flare point that is defined by the end 3206 of the stitched pole 3202.

Figure 33:
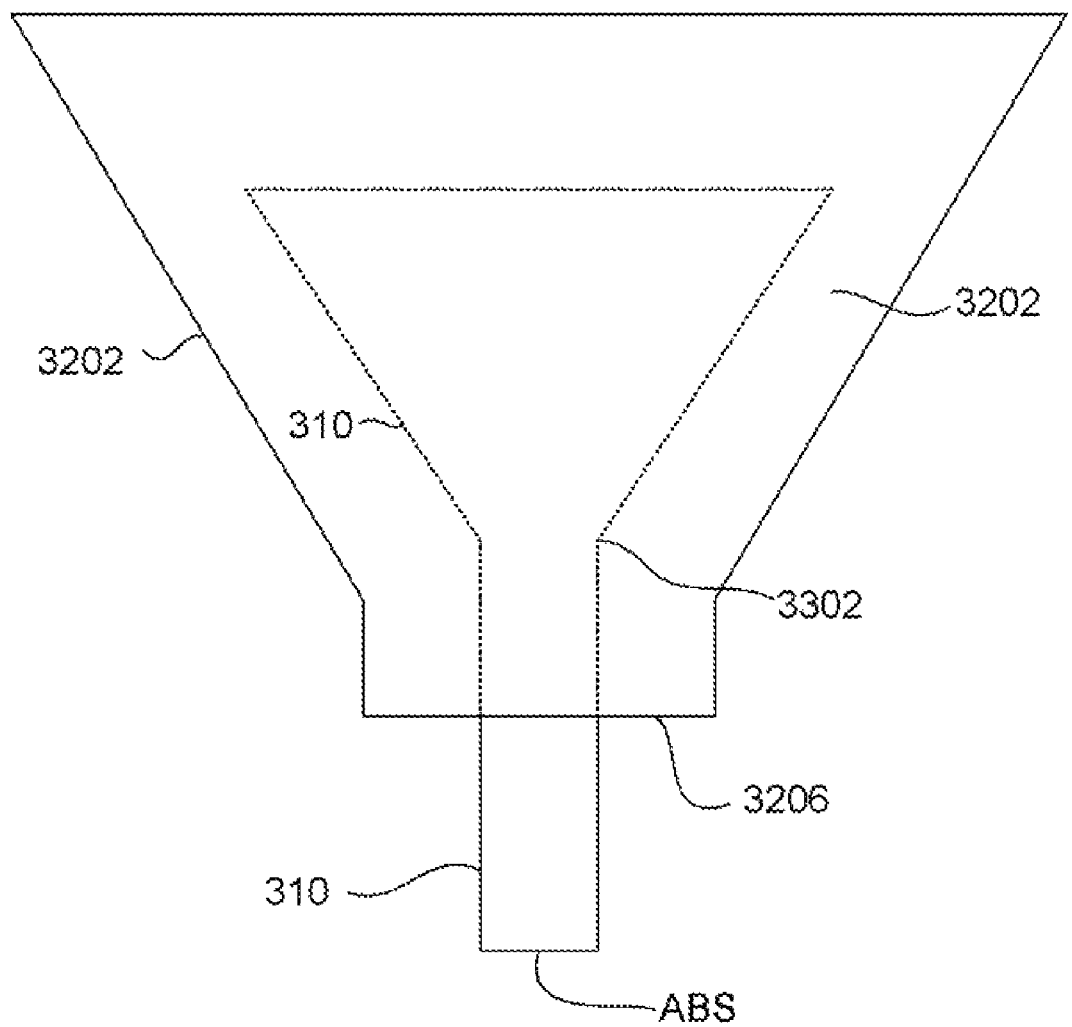
FIG. 33 is a top down view of a magnetic write pole and stitched pole according to the embodiment described with reference to FIG. 32.

This can be understood more clearly with reference to FIG. 33 which shows only the write pole 310 and stitched pole 3202. In FIG. 33, the portions of the write pole 310 that are hidden beneath the stitched pole 3202 are shown in dotted line. As can be seen, the end 3206 extends laterally beyond the sides of the write pole 310, and in this way defines a flare point that is closer to the ABS than the actual flare point 3302 of the write pole 310. Furthermore, the location of this secondary flare point defined by the end 3206 of the stitched pole 3202 is much more easily controlled than the actual flare point 3302 of the write pole 310. This will become more apparent after a discussion below of a method for manufacturing a write head such as the write head 3200. It should also be pointed out that, the stitched pole 3202 could be formed entirely above (i.e. trailing) the write pole 310 or could be formed to wrap around the write pole 310 like a shell.

With reference again to FIG. 32, the head 3202 includes a non-magnetic spacer or bump 3204 formed over the stitched pole 3202. The non-magnetic spacer 3204 provides magnetic separation between the trailing shield 504 and the stitched pole 3202. The non-magnetic spacer layer 2304 can be constructed of alumina or some other non-magnetic material. The stitched pole 3202 can be constructed of CoFe, NiFe or some other non-magnetic material.

Figure 6:
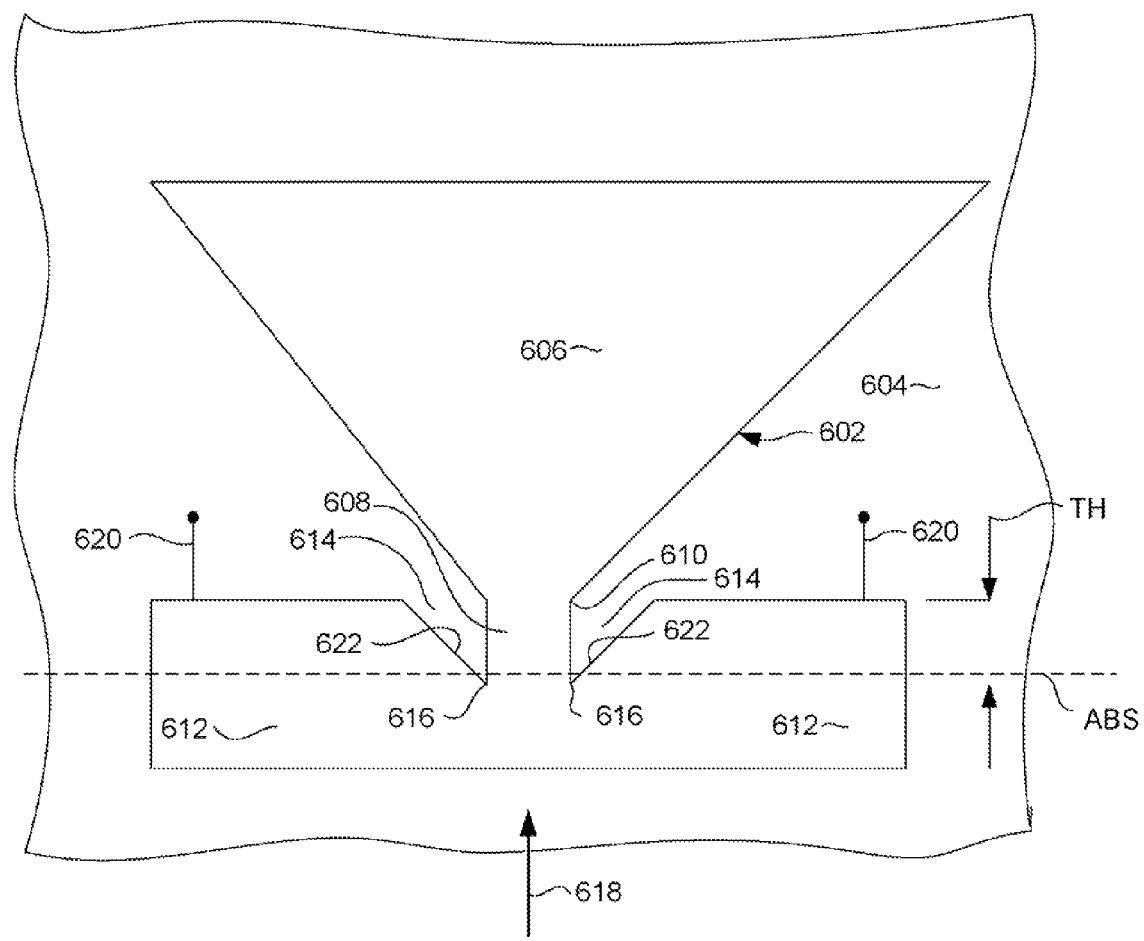
FIG. 6 is a top down view of a magnetic structure formed on a wafer for constructing a magnetic head according to an embodiment of the invention.

With reference now to FIG. 6, a structure and method for accurately controlling the throat height of a side magnetic shield and flare point of a write pole simultaneously is described. A magnetic structure 602 is formed and surrounded by a non-magnetic material 604. The magnetic structure can be constructed of, for example, CoFe or some other magnetic material that would be suitable for both a write pole and a side shield. Therefore, the magnetic structure 602 could be constructed as a lamination of magnetic materials separated by thin layers of non-magnetic material. The magnetic structure includes a write pole portion 606 having a pole tip 608 and a flare point 610. The magnetic structure 602 also includes first and second side shield portions 612, which are connected with the pole tip portion 608 of the write pole portion 606 in a region in front of an intended air bearing surface plane indicated by dashed line denoted ABS. First and second gaps 614 are formed between the side shield portions 612 and the pole tip portion 610. The gaps each have a termination point 616 that is located either at or slightly in front of the intended ABS plane. It should be pointed out that the term "in front of" refers to the downward direction in FIG. 6, whereas the term "behind" refers to an object being above another object as shown in FIG. 6.

It should be understood that a write head is formed on a wafer with many thousands of heads being formed on a single wafer. During fabrication, rows of wafers are sliced from the wafer and are lapped to form an air bearing surface. These rows are then cut into individual sliders, with the body of the slider being provided by the wafer itself. Therefore, in order to define an air bearing surface of the slider and write head, a lapping process proceeds from the direction indicate by arrow 618. When the lapping has proceeded sufficiently that the intended ABS plane has been reached, lapping is terminated. This lapping process, therefore, defines not only the throat height TH of the side shields, but also the location of the flare point 610 relative to the ABS.

The above described structure greatly facilitates the accurate definition of the shield throat height TH as well as the location of the flare point 610 relative to both the ABS and the shields 612. As lapping progresses, a voltage is measured across a set of leads 620 in order to measure the resistance across the magnetic structure 602. These leads could either be connected to each of the shield portions 612 or could be connected so that one lead 620 is connected with a shield portion 612 and the other lead 612 is connected with the write pole portion 606.

As lapping progresses, material will be removed from the front of the magnetic structure 602. The voltage across the leads will increase gradually until the termination point 616 of at least one of the notches 614 is reached. At this point the voltage will increase dramatically, and the resistance will increase essentially to infinity. This provides a clear, accurate indication of where the lapping has progressed to, and can provide a clear indication of when the lapping process should be terminated. In this way the magnetic structure 602 provides an electrical lapping guide (ELG) that is integral with the write pole 606 and side shields 612. This also allows the write pole flare point 610 and side shield throat height TH to be defined in a common photolithographic process.

Additionally or alternatively, the above described magnetic structure 602 allows the lapping progress to be monitored by ABS metrology. As can be seen in FIG. 6, the inner portions of the side shields 612 can be formed with tapered edges 622. What's more, these inner edges can 622 can be formed, photolithographically to have a desired angle relative to the throat portion 608. Once lapping has reached the notch termination point 616, a gap will be formed between throat 608 and each of the side shields 612 as previously discussed. As can be seen, as the lapping progresses further, the size the this gap (not shown in FIG. 6) will increase. Therefore, the progress of the lapping operation can be accurately monitored trigonometrically by measuring the distance between the throat 608 and each of the side shields 612.

Figure 7:
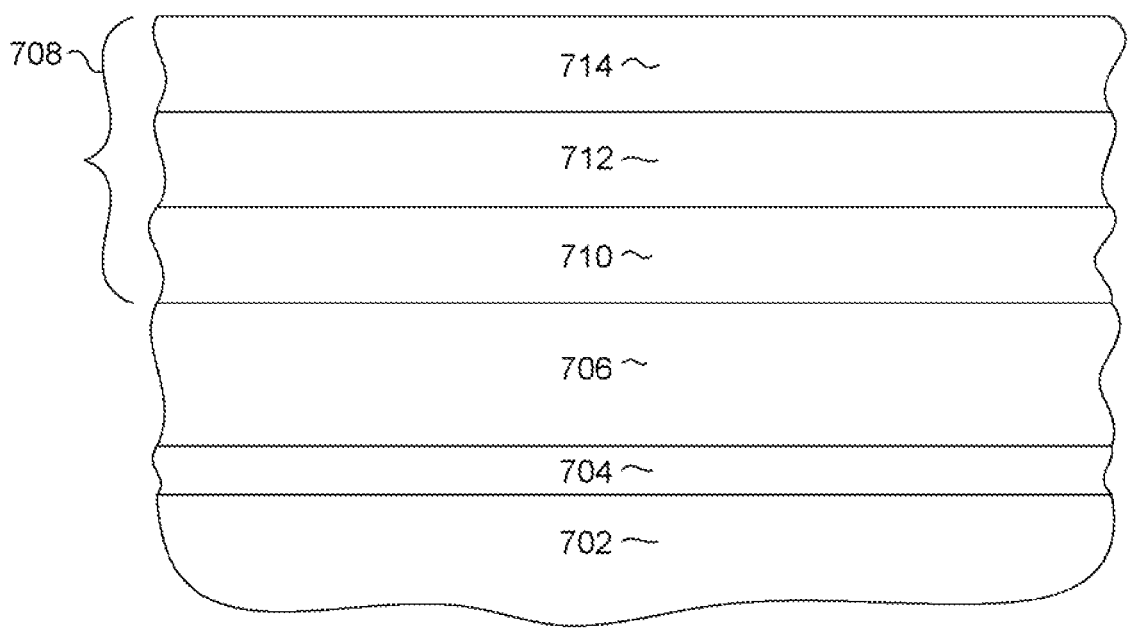
FIGS. 7-15 are cross sectional and top down views of magnetic write head in various intermediate stages of manufacture, illustrating a method for constructing a write pole and side shields according to an embodiment of the invention.

With reference now to FIGS. 7-15, a method for forming a structure such as the magnetic structure 602 of FIG. 6 is described. This method can, therefore, be employed to construct a write head 310 and side shields 408, 410 (FIGS. 3 and 4). With particular reference to FIG. 7, a substrate 702 is provided. The substrate 702 can be a structure or structures underlying the write pole such as the non-magnetic fill layer 320 and shaping layer 312 shown in FIG. 3. A layer of material that is resistant to reactive ion etching (RIE stop layer) 704 can optionally be deposited over the substrate 702. The RIB stop layer can be, for example, (Yi, what should the RIE stop layer be made of?). A layer of non-magnetic fill material such as alumina ($Al_2O_3$) 706 is then deposited over the RIE stop layer 704 and substrate 702. A series of mask layers 708 are then deposited over the non-magnetic fill layer 706. The mask layers 708 can include a RIE mask 710 constructed of a material such as CoFe, Cr or some other material that is resistant to reactive ion etching. A layer of a non-photoreactive resist or soluble polyimide material such as DURA-MIDE® 712 can be deposited over the RIE mask 710, and a photoresist layer 714 can be deposited over the layer 712.

Figure 8:
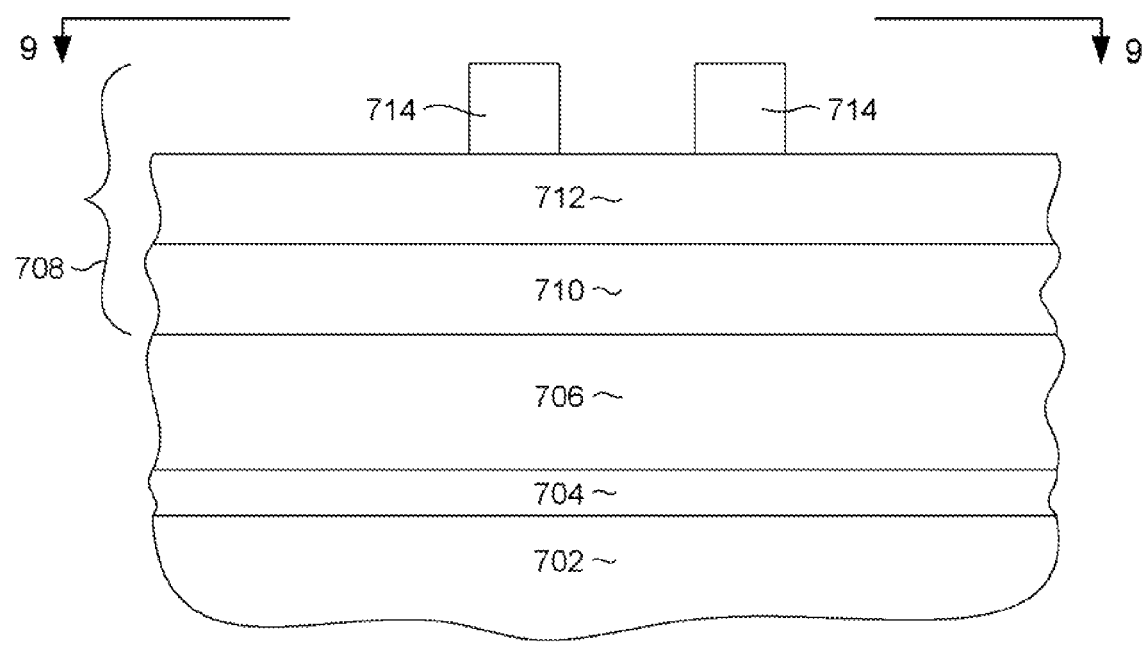
Figure 9:
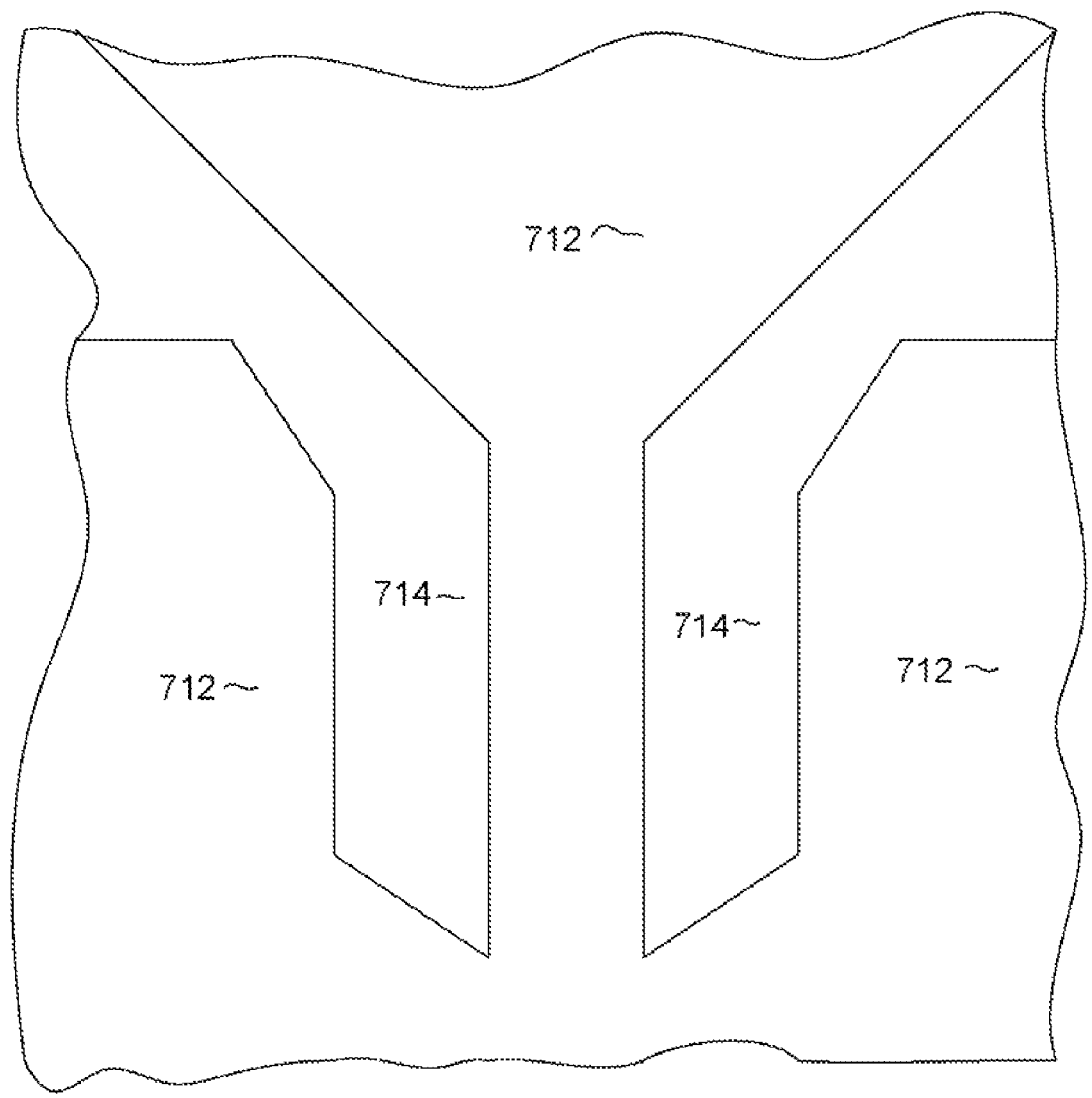
Figure 10:
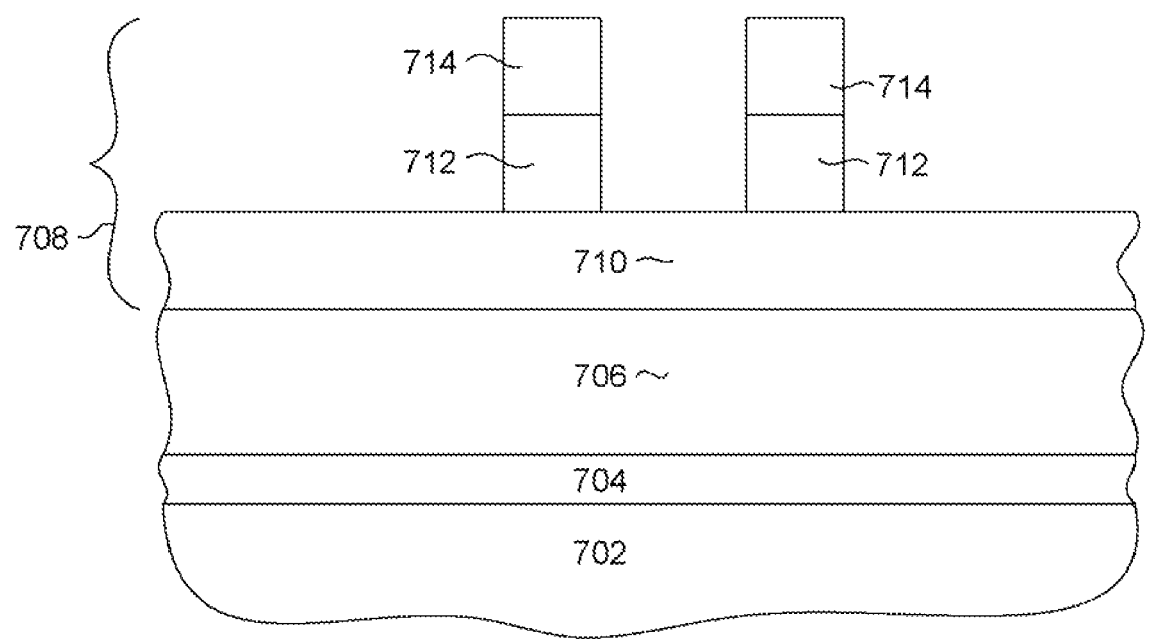
Figure 11:
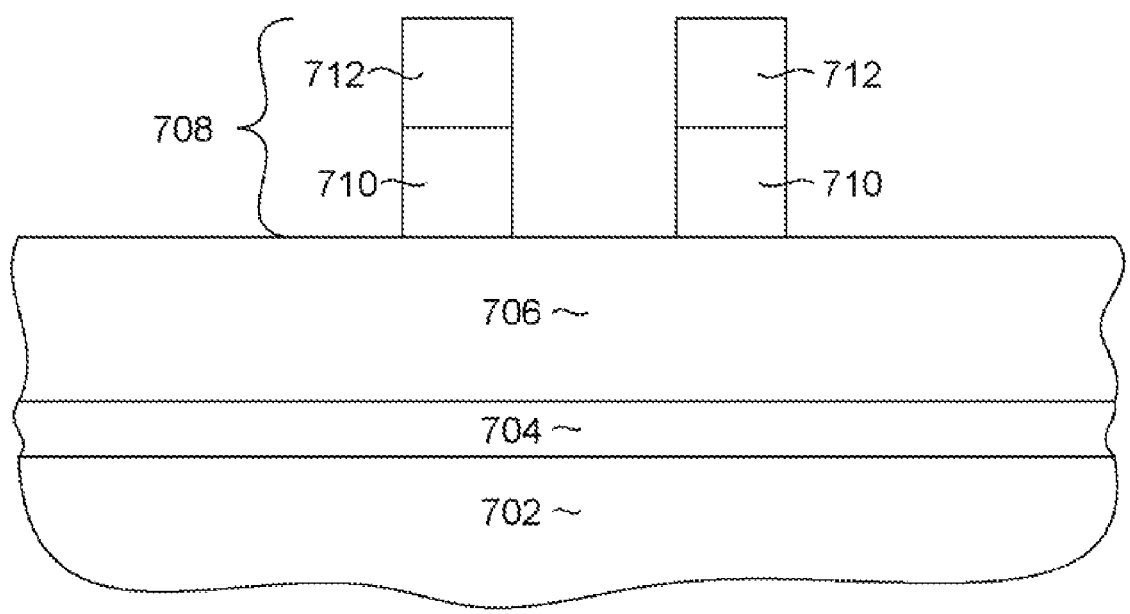

With reference now to FIG. 8 the photoresist layer 714 can be photolithographically patterned to form a pattern that defines a gap between a side shield and a write pole as will become clearer below. This pattern can be seen more clearly with reference to FIG. 9 which shows a top-down view of the mask structure 708. With reference now to FIG. 10, a reactive ion etch (RIE) is performed to transfer the image of the photo-mask 714 onto the underlying layer 712. Then, with reference to FIG. 11, an ion milling is performed to remove portions of the RIE mask 710 that are not covered by the overlying layer 712. The remaining photo-mask 714 (FIG. 10) may be removed by the ion milling.

Figure 12:
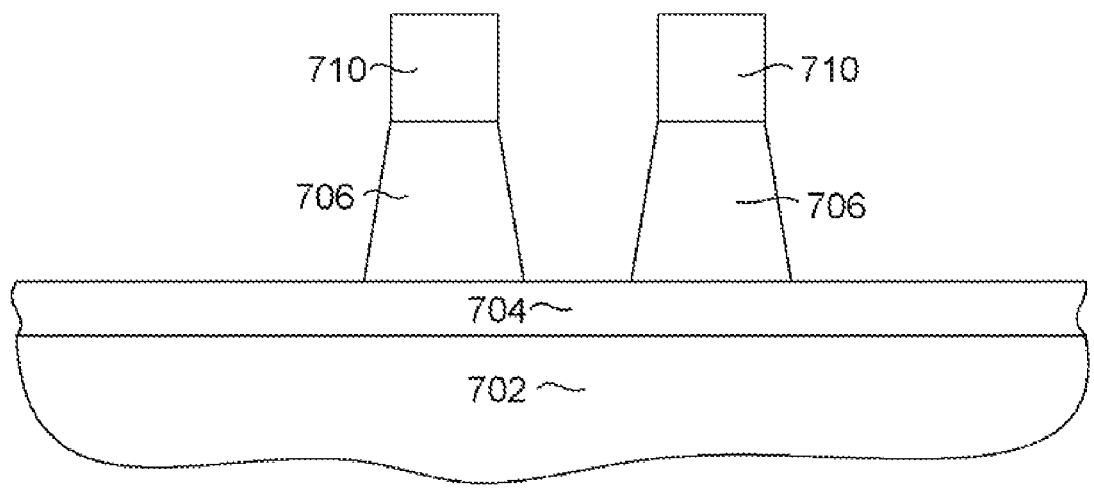

With reference now to FIG. 12, another reactive ion etch (RIE) is performed to remove portions of the non-magnetic fill layer 706 that are not covered by the remaining mask structure (e.g. RIE mask 710). This RIE is preferably a chlorine based RIE if the fill layer 706 is constructed of alumina. This results in a structure having desired tapered side walls as shown. These tapered side walls will result in a write pole having a desired trapezoidal shape as discussed earlier with reference to FIG. 4.

Figure 13:
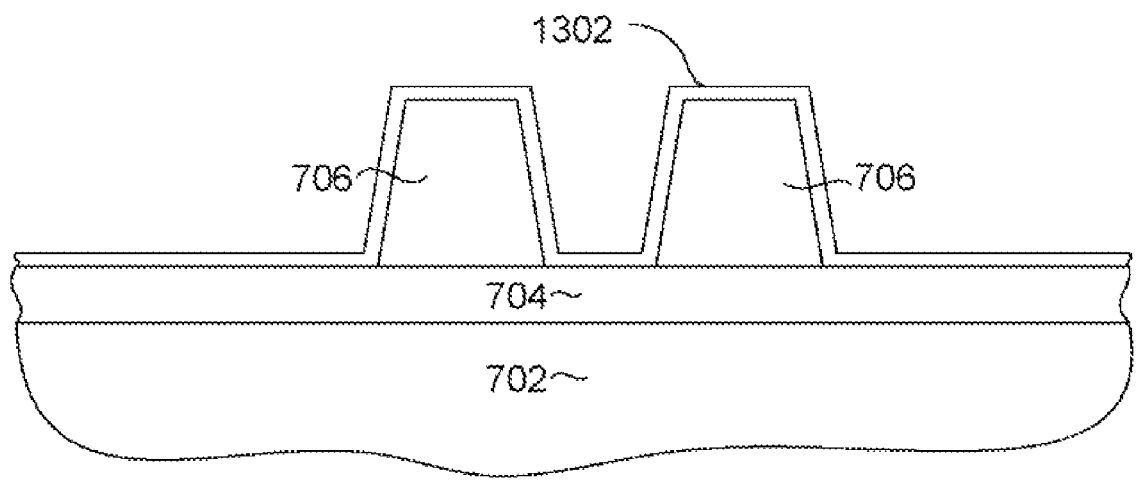
Figure 14:
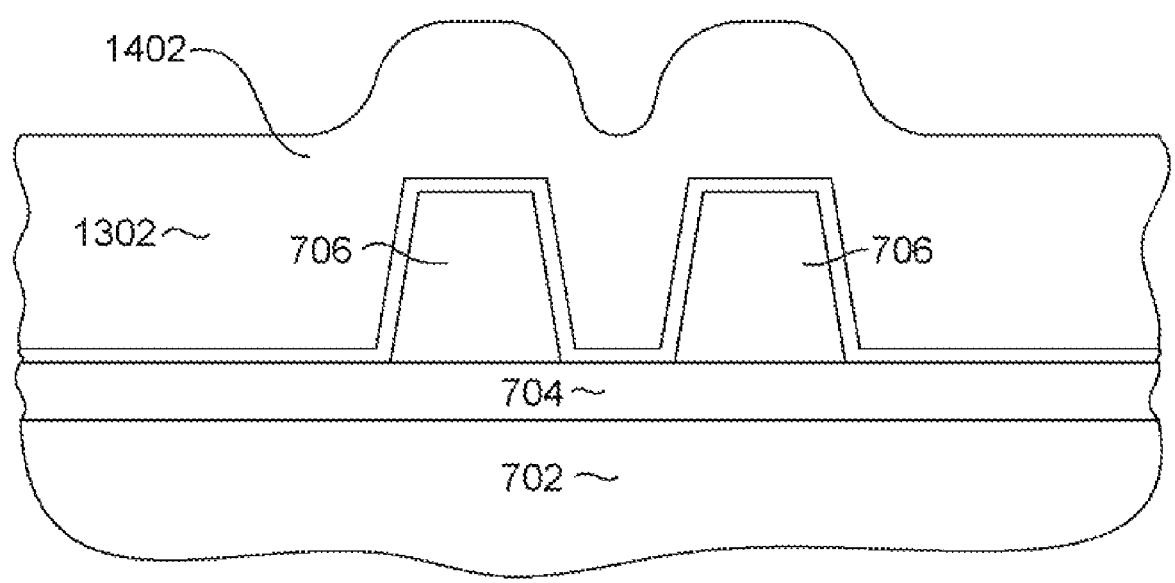
Figure 15:
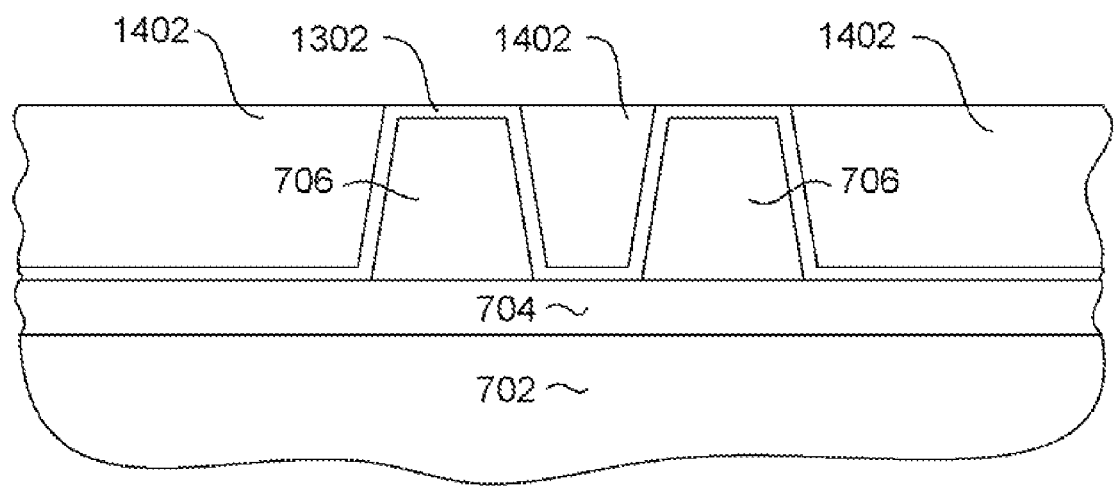

With reference now to FIG. 13, any remaining mask layer 710 can be removed and a layer of material that is resistant to chemical mechanical polishing (CMP stop layer) 1302 is deposited. Then, with reference to FIG. 14, a magnetic material 1402 such as CoFe, or possibly a lamination of magnetic layers and thin non-magnetic layers, is deposited. The magnetic material 1402 can be deposited by electroplating by first depositing a seed layer, and then electroplating the magnetic material. Then, with reference to FIG. 15, a chemical mechanical polishing process (CMP) is performed until the CMP stop layer 1302 has been reached. The remaining magnetic material 1402, then, can form a write pole 310 and side shields 408, 410 described with reference to FIGS. 3, 4, 5 and 32. The above described process can also be used to construct the magnetic structure 602 described with reference to FIG. 6.

Figure 16:
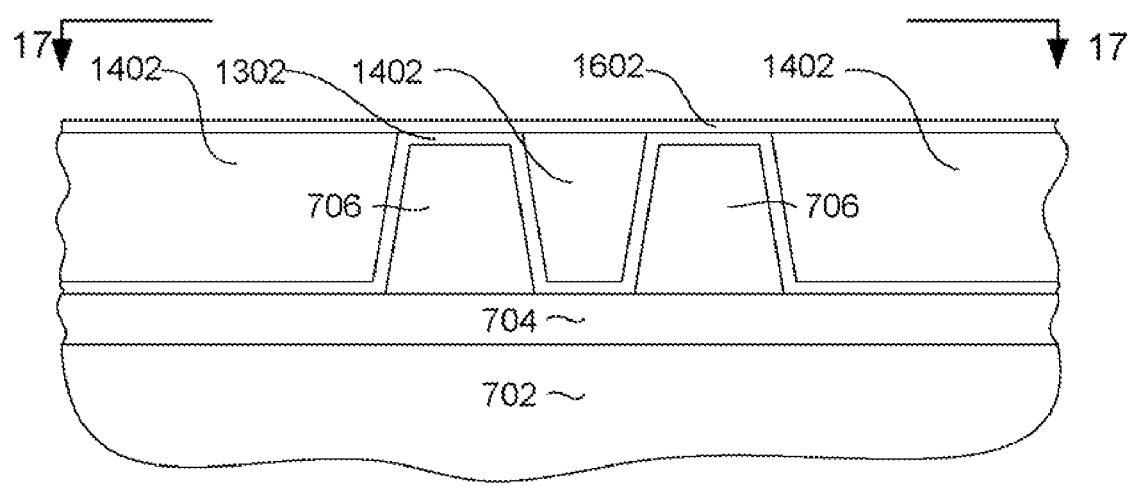
FIGS. 16-22 are cross sectional and top down views of a magnetic head in various intermediate stages of manufacture illustrating a method for manufacturing a write head according to an embodiment of the invention.

With reference now to FIGS. 16-22 a further method is described for constructing a head 502 described in FIG. 5. With particular reference to FIG. 16, starting with a structure as described above with reference to FIG. 15, a non-magnetic material 1602 is deposited to such as thickness as to define a trailing gap (506 in FIG. 5). The non-magnetic material 1602 could be, for example, alumina or could be some other non-magnetic material.

Figure 17:
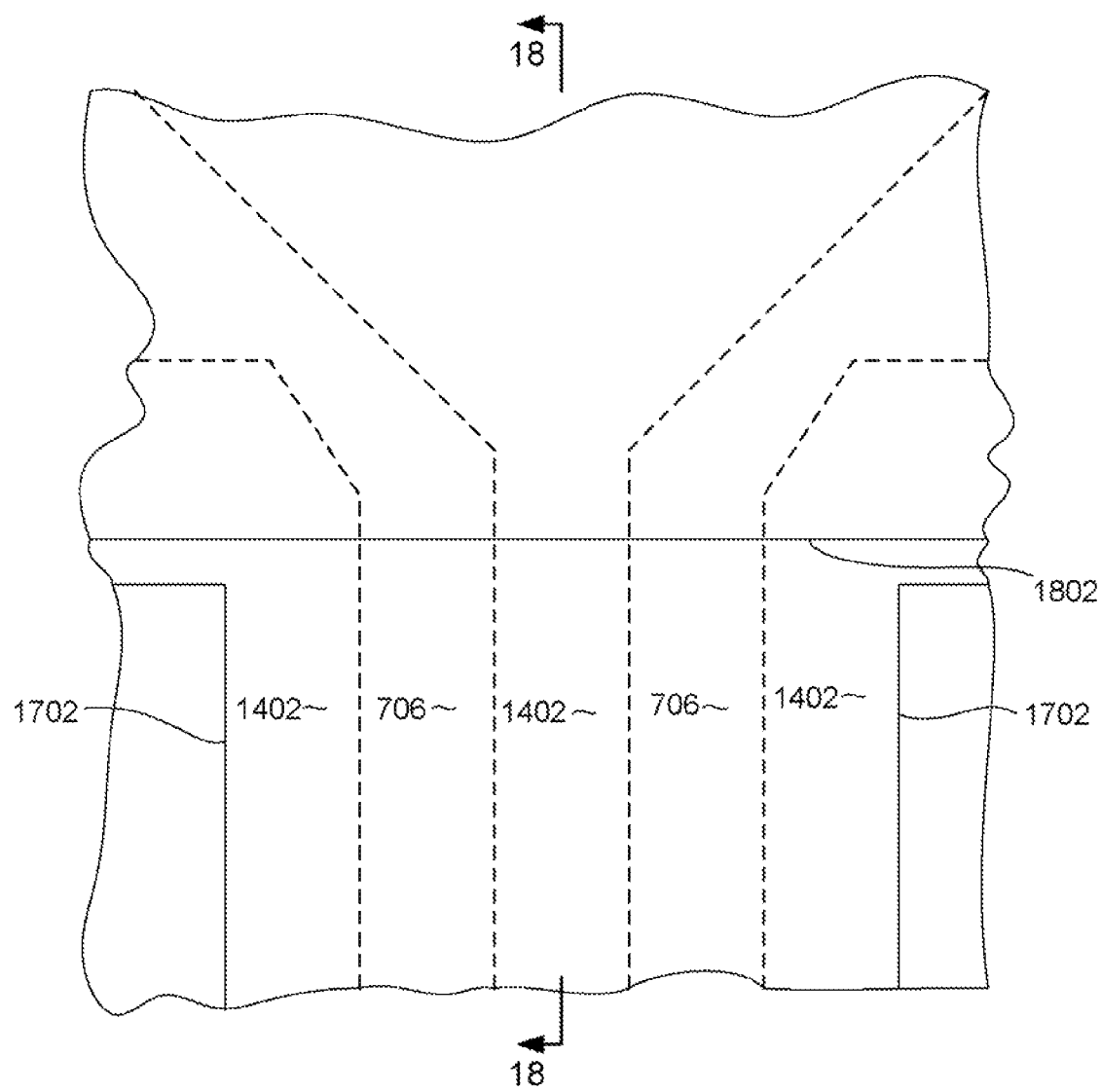
Figure 18:
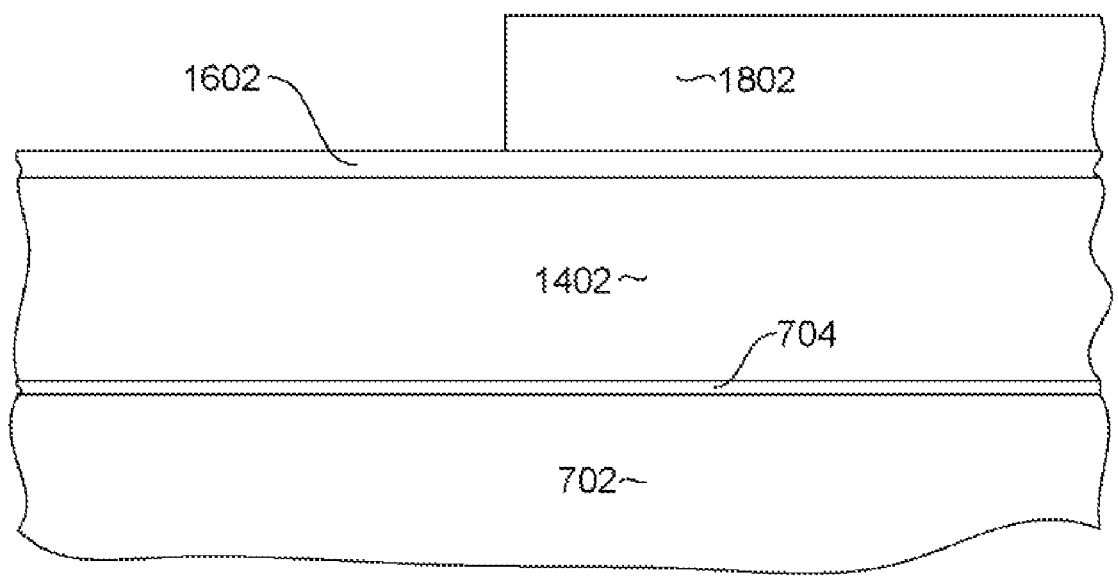

With reference to FIGS. 17 and 18, a non-magnetic bump layer 1802 is formed over the non-magnetic trailing gap layer. The non-magnetic bump 1802 can be constructed of, for example, alumina and can be constructed by a liftoff process. As shown in FIG. 17, the structure hidden beneath the trailing gap layer 1602 and alumina bump 1802 are shown in dashed line. As shown in FIG. 17 the non-magnetic trailing gap layer 1602 can be configured with cutouts or notches 1702 to allow the side shields to be magnetically connected with the trailing shield as will become clearer below.

Figure 19:
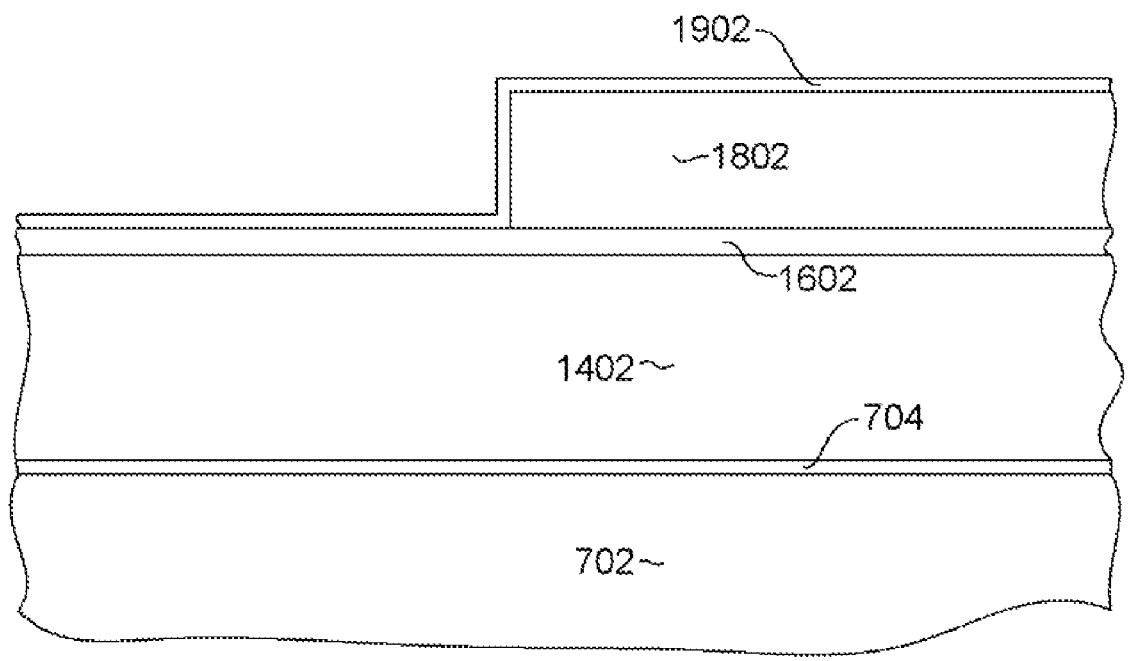
Figure 20:
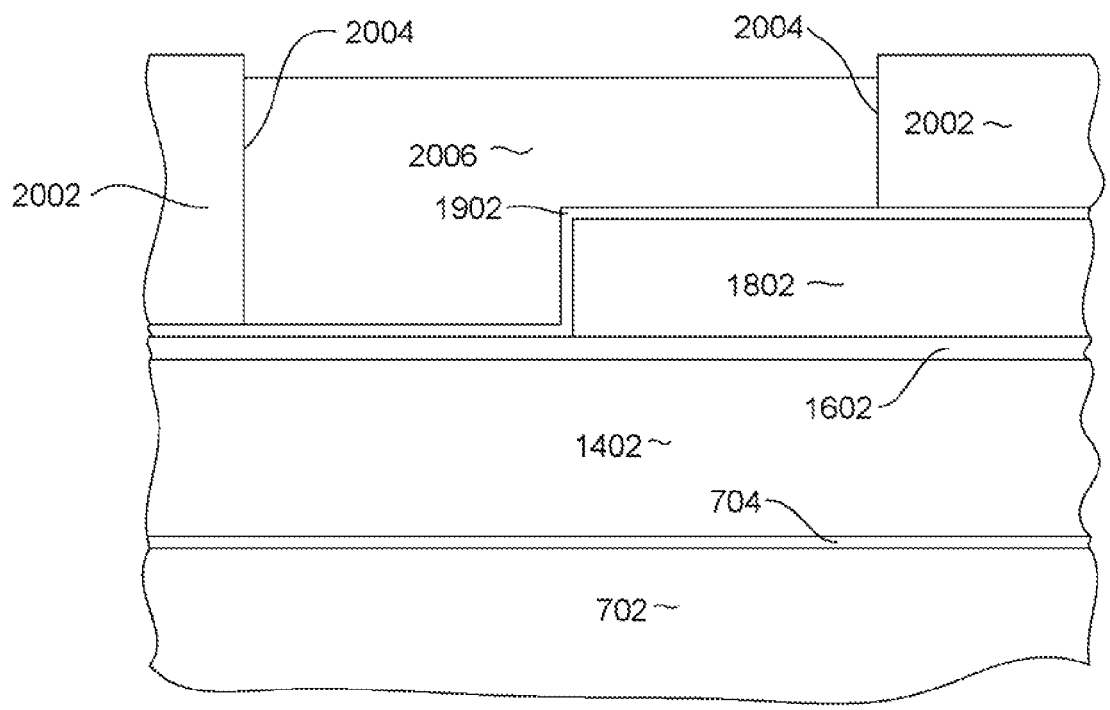
Figure 21:
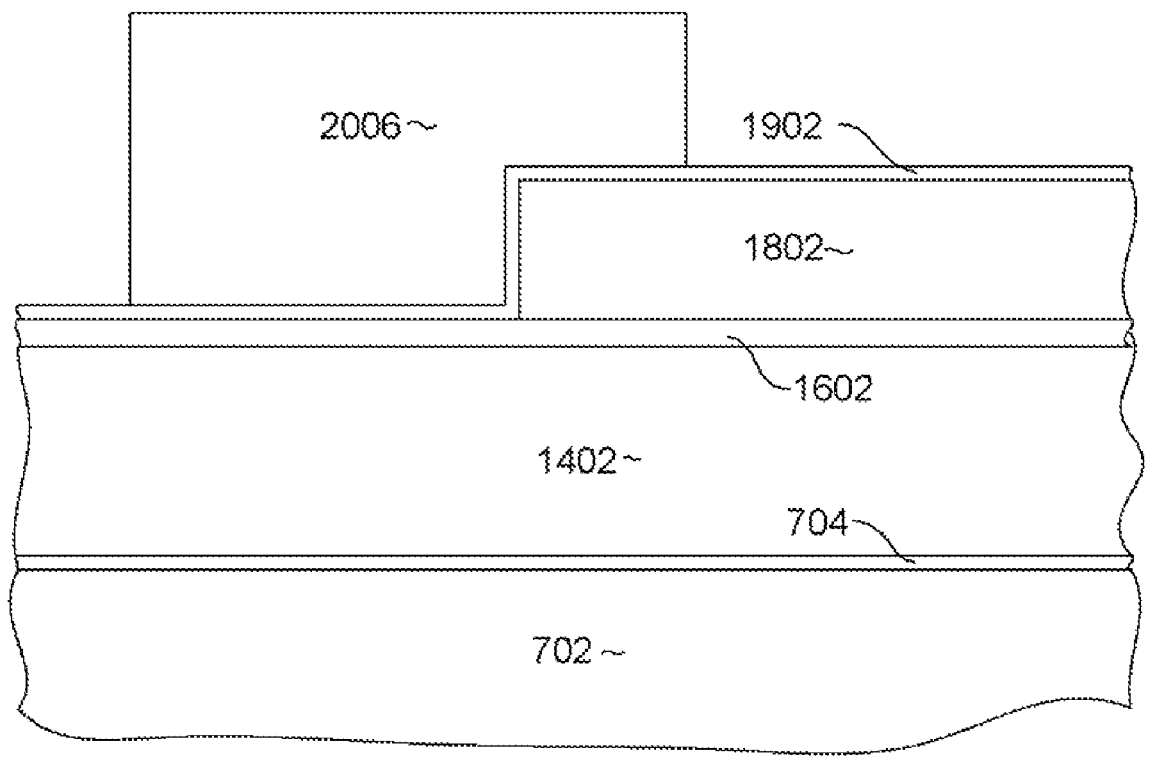
Figure 22:
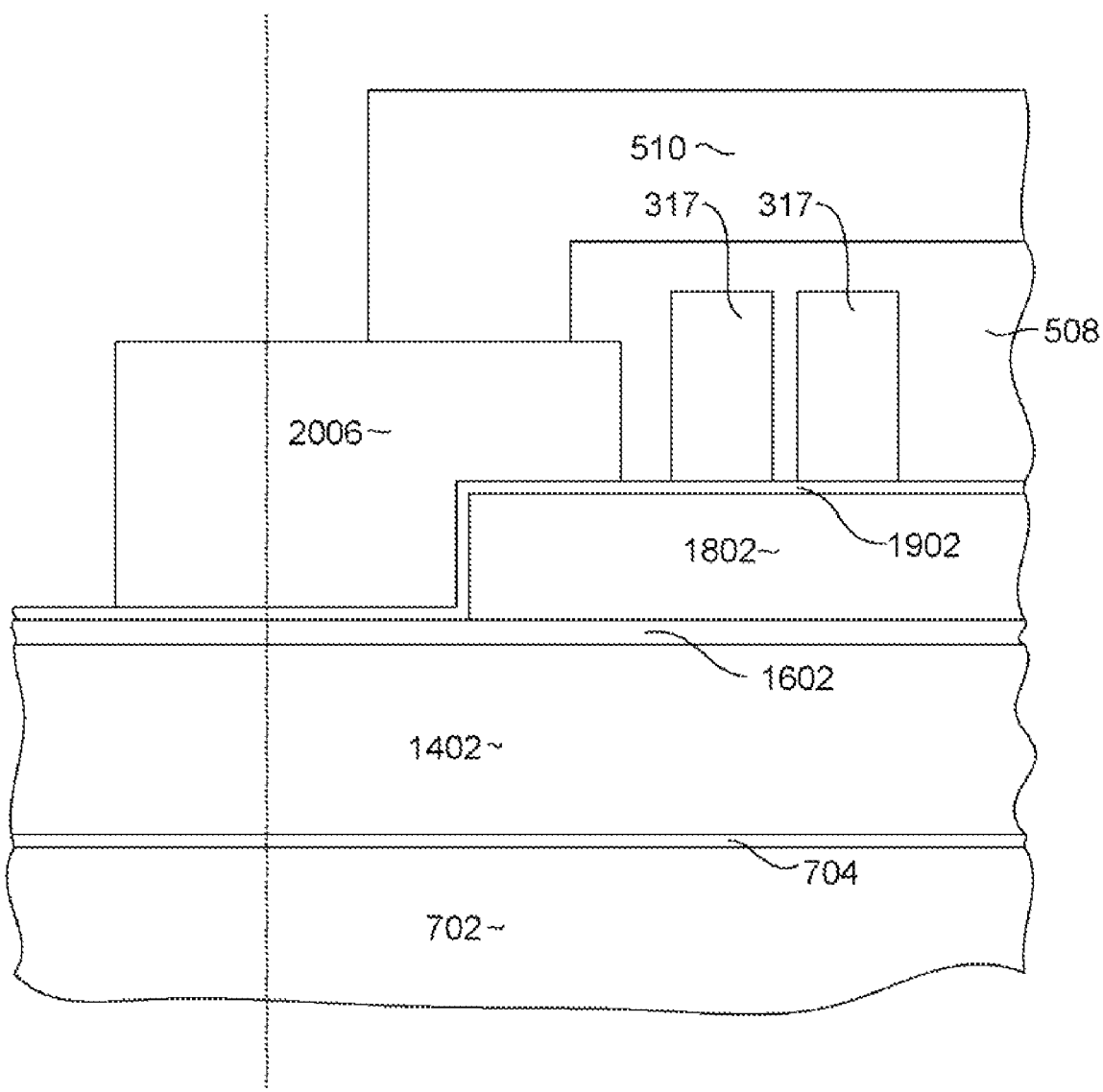

With reference now to FIG. 19, an electrically conductive, magnetic seed layer 1902 such as Rh is deposited. Then, with reference to FIG. 20, a photoresist mask 2002 is formed, having an opening 2004 configured to define a trailing magnetic shield. A magnetic material such as CoFe is then deposited into the opening 2002 to form a trailing magnetic shield 2006 that extends over the alumina bump 1802. Then, with reference to FIG. 21, the mask 2002 can be lifted off or stripped off, leaving the trailing magnetic shield 2006. With reference to FIG. 22, a series of upper coil leads 317, insulation layer 508 and trailing magnetic return pole 510 can be formed to form a head as in FIG. 5. The trailing shield 2006 corresponds to the trailing shield 504 of FIG. 5.

Figure 23:
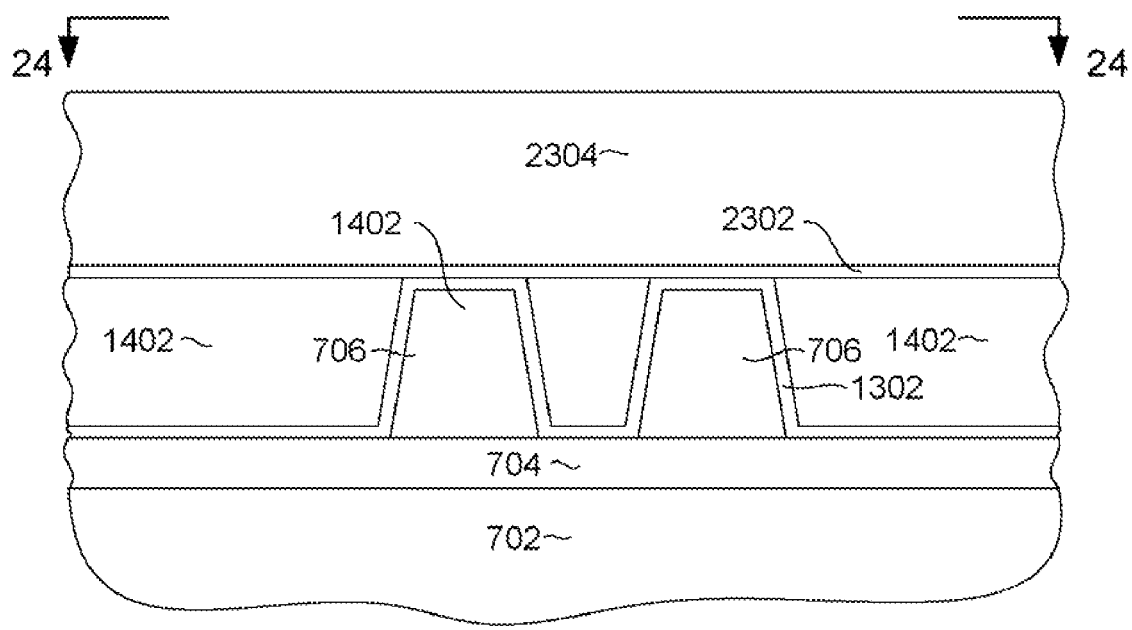
FIGS. 23-31 are cross sectional and top down views of a magnetic head in various intermediate stages of manufacture illustrating a method for manufacturing a write head according to another embodiment of the invention.
Figure 24:
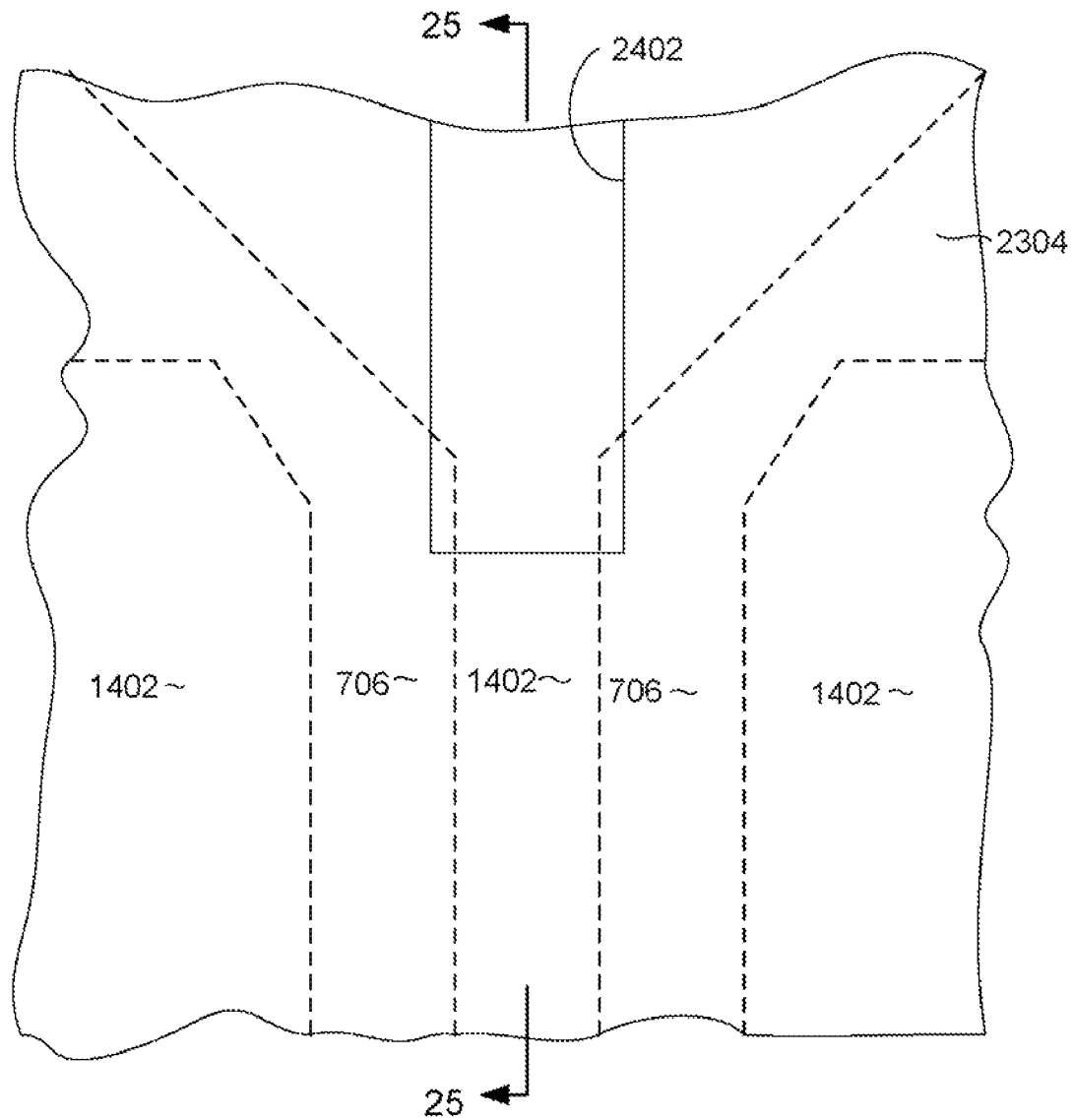
Figure 25:
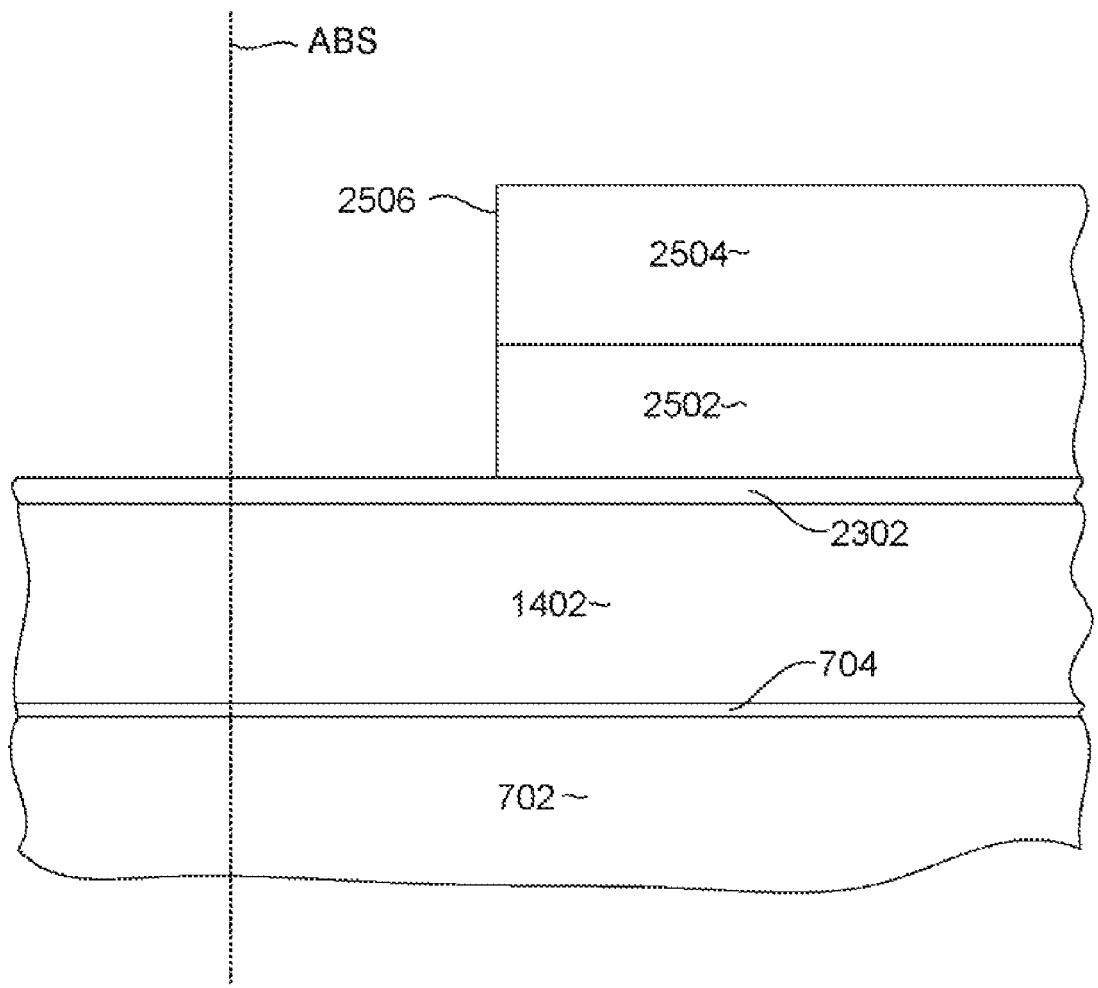

With reference now to FIGS. 23-31, a method is described for constructing a head such as the head 3200 described with reference to FIG. 32. With particular reference to FIG. 23, and starting with a structure such as that described above with reference to FIG. 15, a magnetic seed layer 2302 is deposited. A photoresist mask 2304 is formed over the magnetic seed layer. With reference to FIG. 24, which shows a top down view of the structure of FIG. 23, it can be seen that the mask 2304 is formed with an opening 2402. A magnetic material such as CoFe is then deposited into the trench 2402 followed by a non-magnetic material such as alumina. After deposition of the magnetic material and non-magnetic material, the mask can be lifted off, resulting in a structure shown in side cross section in FIG. 25. As can be seen, the magnetic material 2502 and non-magnetic material 2504 previously deposited into the trench 2402 (FIG. 24) are self aligned with one another having a common front edge 2506 spaced a desired distance from an intended air bearing surface (ABS). The magnetic layer 2502 forms the stitched pole 3202 described above with reference to FIGS. 32-33, and therefore, the front edge 2506 of the magnetic layer 2502 defines the secondary flare point discussed earlier with reference to FIG. 33.

Figure 26:
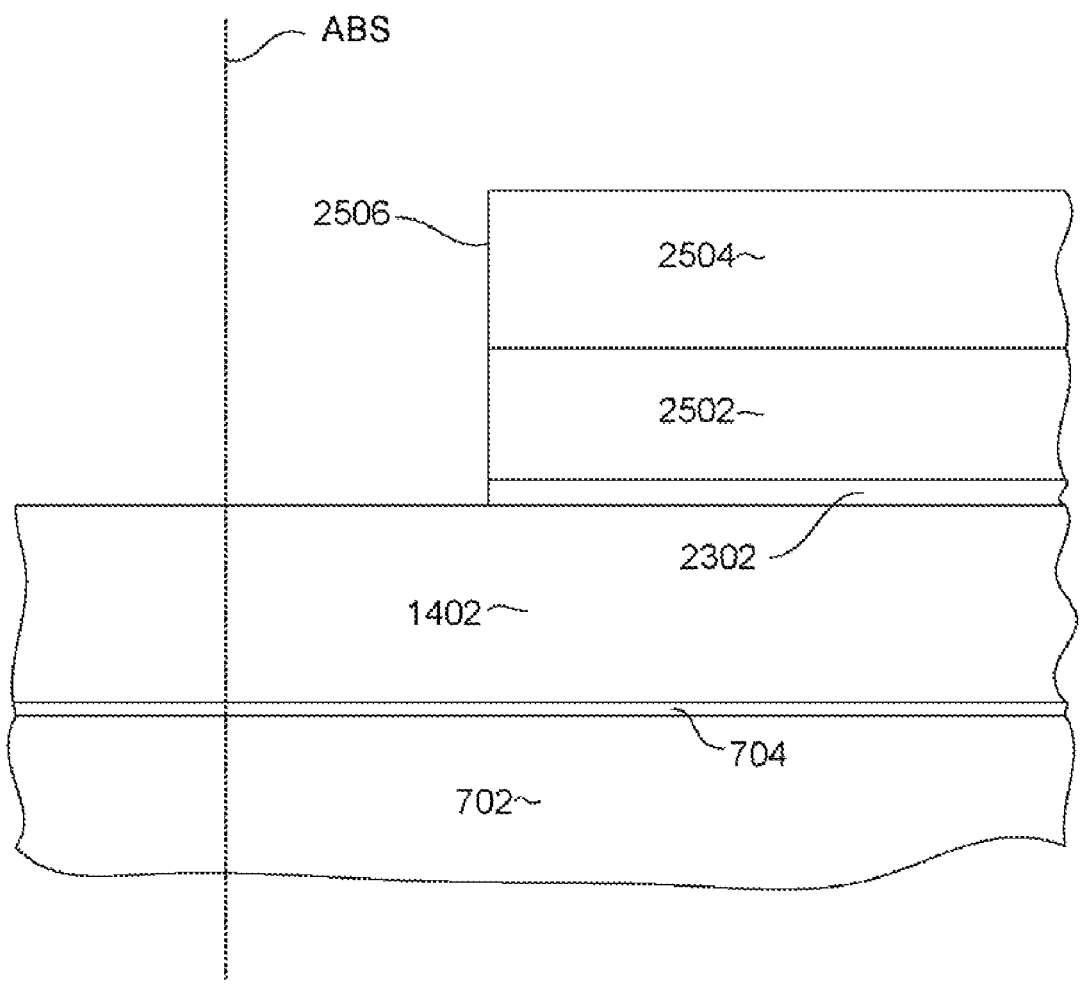
Figure 27:
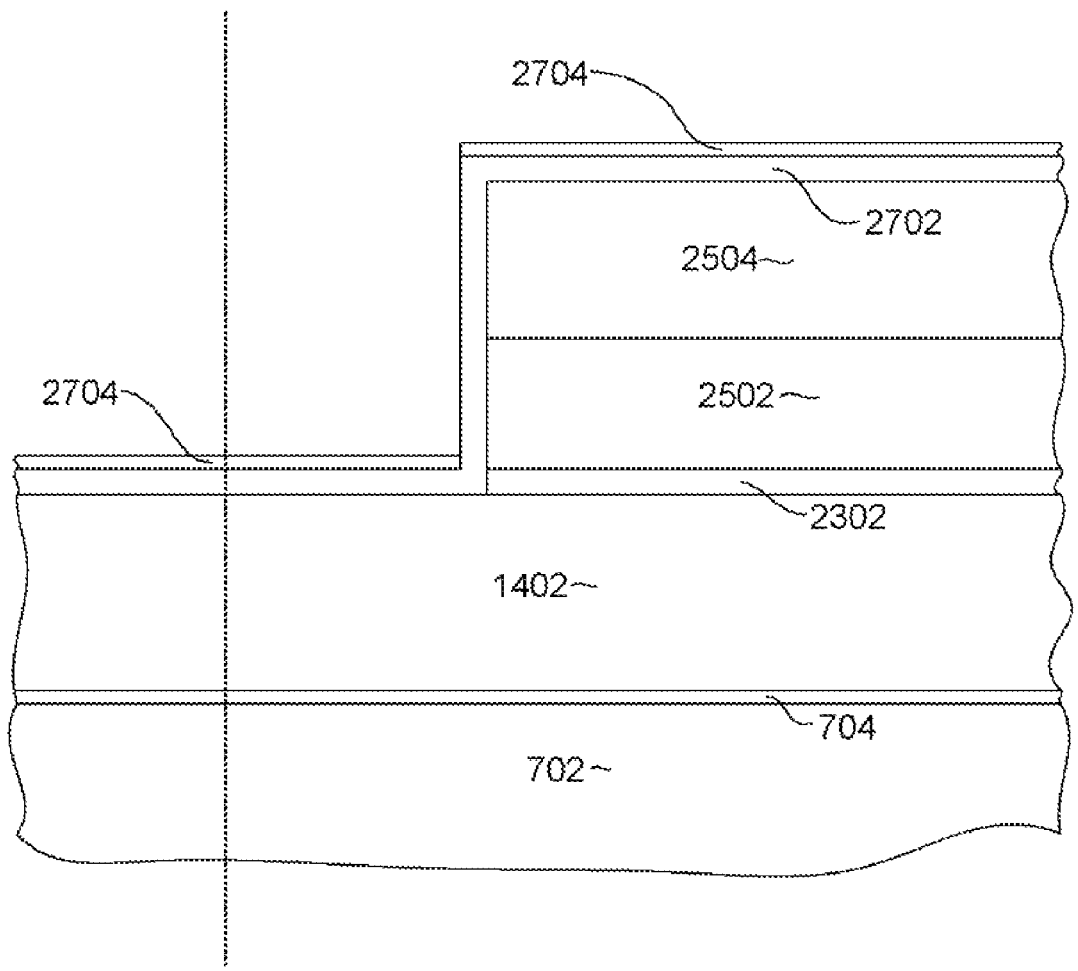
Figure 28:
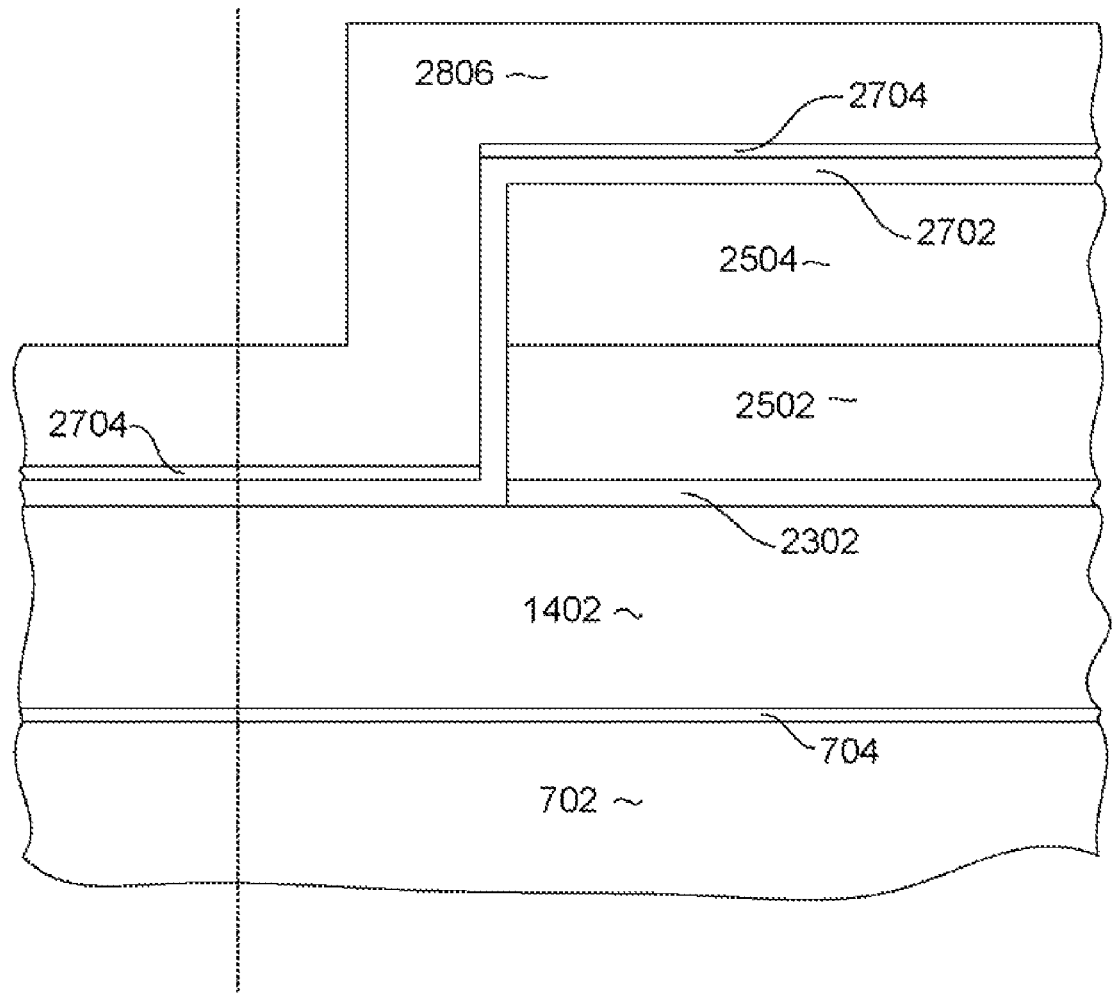

With reference now to FIG. 26, an ion milling is performed to remove portions of the seed layer 2302 that are not covered by the magnetic layer 2502 and non-magnetic layer 2504. Then, with reference to FIG. 27, a first non-magnetic layer (trailing gap layer) 2702 is deposited to a thickness that is chosen to define a desired trailing gap thickness, such as, for example, about 5 nm. The trailing gap layer 2702 can be, for example, alumina and is preferably deposited by a conformal deposition method such as atomic layer deposition (ALD) chemical vapor deposition, etc. An end point detection layer 2704 is then deposited over the trailing gap layer 2702. The end point detection layer 2704 can be constructed of a material that can be easily detected by a process such as Secondary Ion Mass Spectroscopy (SIMS). A suitable material for the end point detection layer 2704 could be Cr which could be about 300 nm thick. Then, with reference to FIG. 28, a second non-magnetic layer 2806 is deposited over the trailing gap layer 2702 and end point detection layer. The non-magnetic layer 2806, which can be referred to as a front end spacer layer 2806, can be constructed of a material such as conformally deposited alumina.

Figure 29:
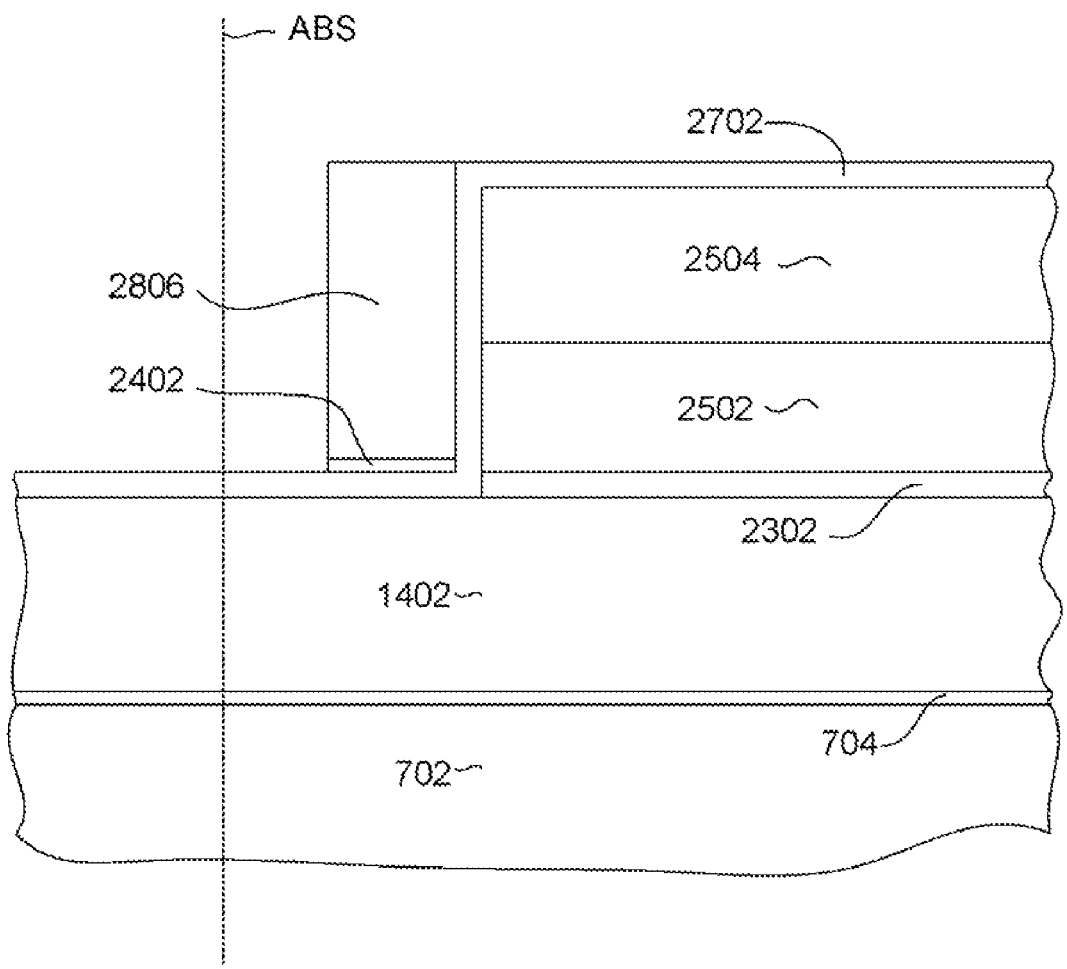

Then, with reference to FIG. 29, an ion milling is performed to remove portions of the front end spacer layer 2806 until the end point detection layer 2704 has been reached. The front ion milling preferentially removes horizontally disposed portions of the non-magnetic layer 2806, leaving a vertical wall of non-magnetic material 2806 that forms a non-magnetic front end spacer between the trailing shield and stitched pole as will be described below.

Figure 30:
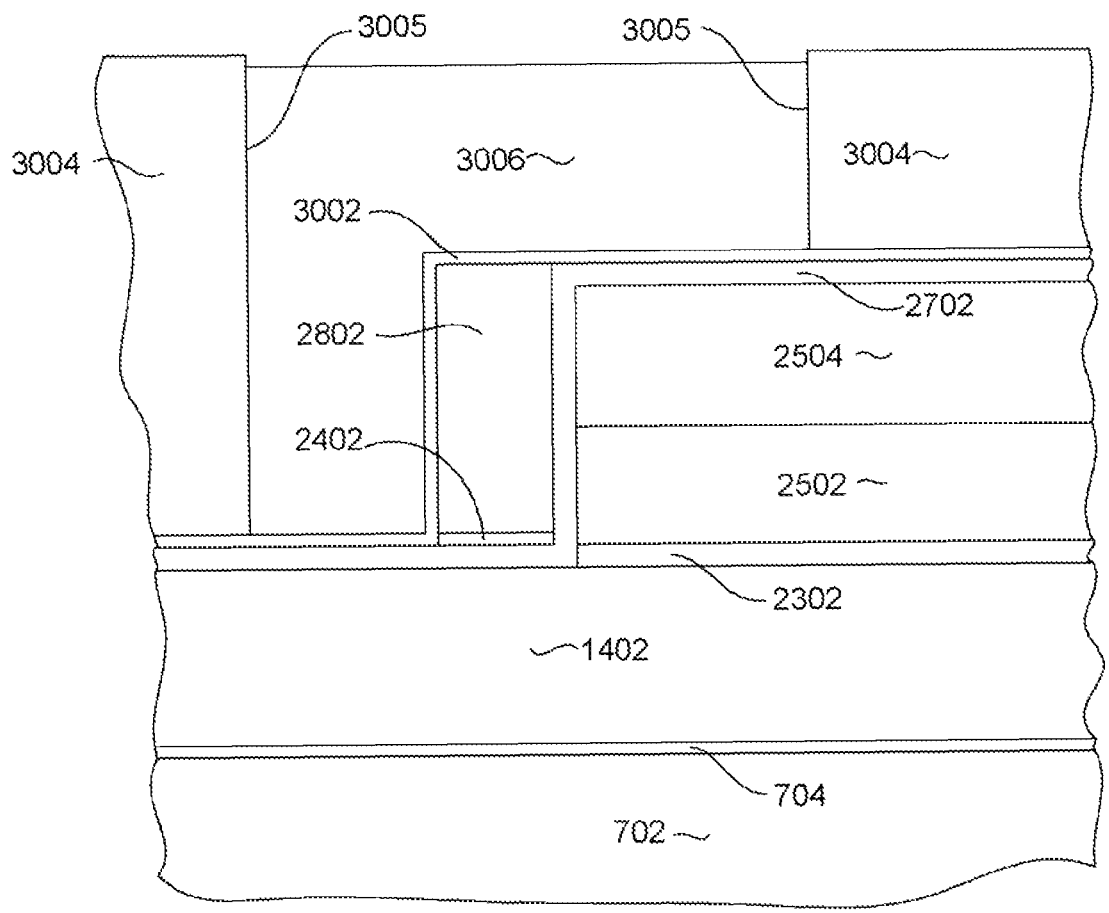
Figure 31:
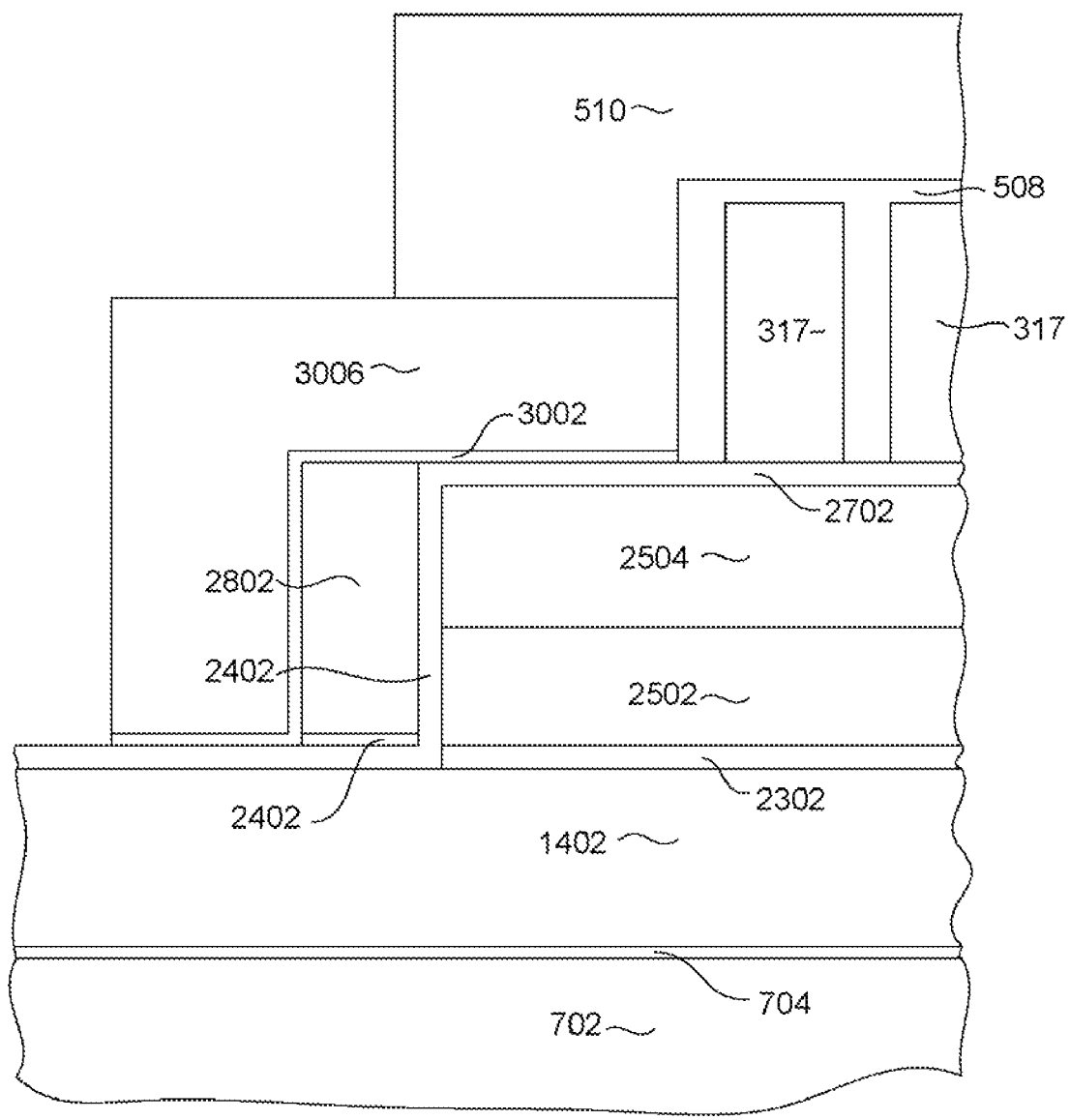

Now, with reference to FIG. 30, an electrically conductive, magnetic seed layer 3002 is deposited. Then, a resist mask 3004 is formed that has an opening 3305 that is configured to define a trailing magnetic shield. A magnetic material such as NiFe or CoFe can then be deposited into the opening formed in the photoresist mask 3004 to from a trailing magnetic shield 3006. The photoresist mask 3004 can then be lifted off, and an ion milling can be performed to remove portions of the seed layer 3002 that are not protected by the trailing magnetic shield 3006. Then, with reference to FIG. 31, the upper leads of the coil 317, upper coil insulation layer 508 and trailing, magnetic return pole 510 can be formed.

Figure 34:
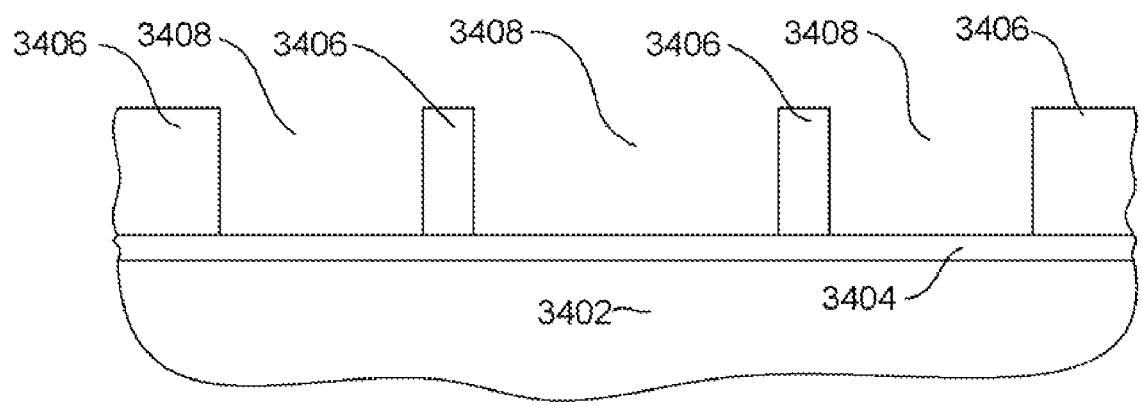
FIGS. 34-37 are views of a portion of a write head in various intermediate stages of manufacturing illustrating a method of manufacturing a magnetic write head according to an embodiment of the invention.
Figure 35:
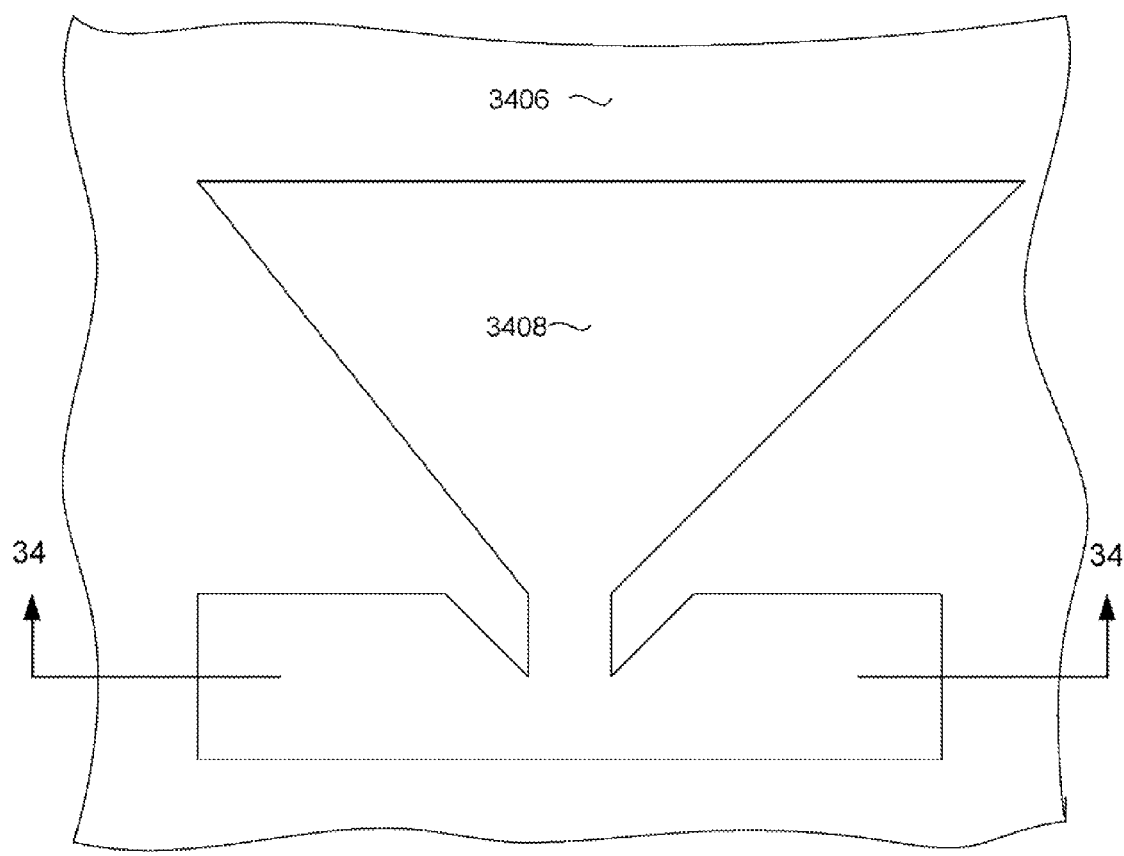
Figure 36:
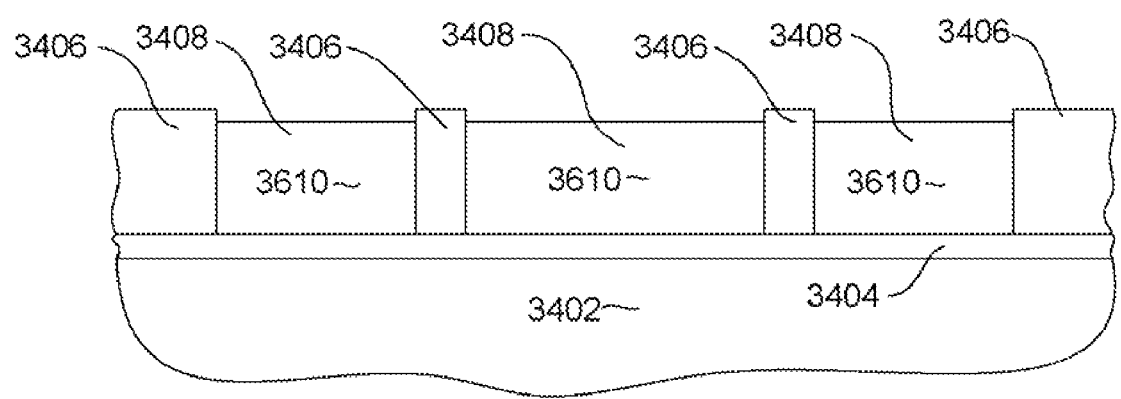
Figure 37:
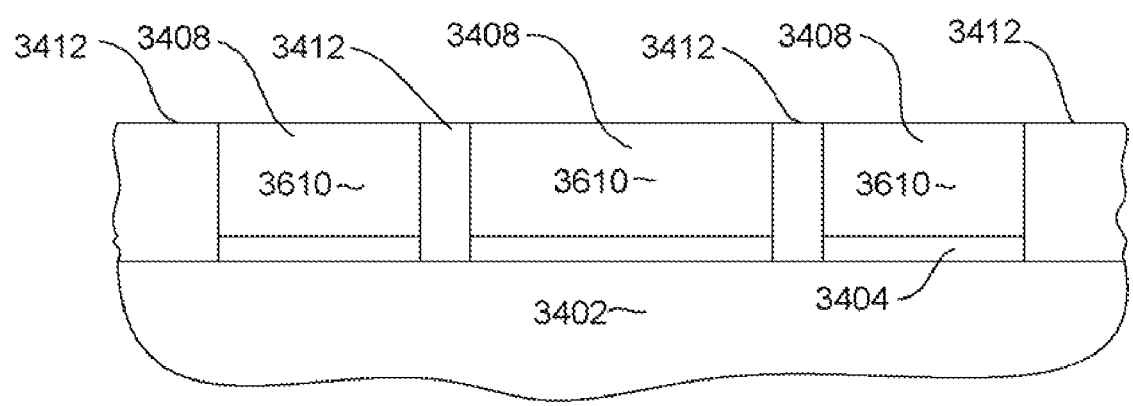

With reference now to FIGS. 34-39, an alternate method is described for constructing a magnetic structure 602, such as that described in FIG. 6. With particular reference to FIG. 34, a substrate 3402 is provided. This substrate 3402 could include, for example, the alumina fill layer 320 and magnetic shaping layer 312 described with reference to FIG. 3. Then, a non-magnetic, electrically conductive seed layer 3404 such as Rh can be deposited over the substrate 3402. A photoresist mask frame 3406 can then be formed over the seed layer 3404 using photolithographic and developing processes. FIG. 35 shows a top down view of the photoresist mask and as can be seen, the mask 3406 is formed with an opening 3408 that can be configured to define the magnetic structure 602 described with reference to FIG. 6. The mask 3406 as shown in FIG. 34, is a sectional view shown from line 34-34 of FIG. 35. Then, with reference to FIG. 36 a magnetic material 3410 can be deposited into the opening 3408 of the mask 3406. Then, with reference to FIG. 37, the photoresist can be lifted off. The seed layer 3404 can optionally be removed in areas not covered by the magnetic material 3410, for example by etching, or can be left intact. A fill layer 3412 such as alumina can then be deposited and a CMP process can be performed to planarize the tops of the fill layer 3412 and magnetic layer 3410.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic write head, comprising:
   providing a substrate;
   depositing a layer of alumina over the substrate
   forming a mask structure over the layer of alumina, the mask structure including a reactive ion etching mask (RIE mask) that is resistant to removal by reactive ion etching formed over the layer of alumina and a resist mask formed above the RIE mask;
   performing a material removal processes to remove portions of the alumina layer that are not protected by the mask structure;
   depositing a chemical mechanical polishing (CMP) stop layer that is resistant to chemical mechanical polishing;
   depositing a magnetic material; and
   performing a chemical mechanical polishing process until the CMP stop layer has been reached;
   wherein the mask structure is patterned to have an opening that defines a structure having a write pole portion and first and second side shield portions, the side shield portions being connected with the write pole portion in a region in front of an intended air bearing surface plane and being disconnected from the write pole portion in a region behind the air bearing surface plane.

2. The method as in claim 1 wherein the material removal process comprises ion milling.

3. The method as in claim 1 wherein the material removal process comprises reactive ion milling using a chlorine chemistry.

4. The method as in claim 1 wherein the RIE mask comprises a material selected from the group consisting of CoFe and Cr.

5. The method as in claim 1 wherein the CMP stop layer comprises a material selected from the group consisting of Zr, Rh and Ru.

6. The method as in claim 1 wherein the depositing a magnetic material comprises electroplating a magnetic material.

7. A method for manufacturing a magnetic write head, comprising:
   providing a substrate;
   depositing a RIE stop layer over the substrate;
   depositing a layer of alumina over the RIE stop layer;
   forming a mask structure over the layer of alumina, the mask structure including a reactive ion etching mask (RIE mask) that is resistant to removal by reactive ion etching formed over the layer of alumina and a resist mask formed above the RIE mask;
   performing a material removal processes to remove portions of the alumina layer that are not protected by the mask structure;
   depositing a chemical mechanical polishing (CMP) stop layer that is resistant to chemical mechanical polishing;
   depositing a magnetic material; and
   performing a chemical mechanical polishing process until the CMP stop layer has been reached.

8. The method as in claim 7, wherein the mask structure is patterned to have an opening that defines a structure having a write pole portion and first and second side shield portions.

9. A method for manufacturing a magnetic write head, comprising:
   providing a substrate;
   depositing a layer of alumina over the substrate
   forming a mask structure over the layer of alumina, the mask structure including a reactive ion etching mask (RIE mask) that is resistant to removal by reactive ion etching formed over the layer of alumina and a resist mask formed above the RIE mask;
   performing a material removal processes to remove portions of the alumina layer that are not protected by the mask structure;
   depositing a chemical mechanical polishing (CMP) stop layer that is resistant to chemical mechanical polishing;
   depositing a magnetic material; and
   performing a chemical mechanical polishing process until the CMP stop layer has been reached;
   wherein the depositing a magnetic material forms a write pole and first and second side shields, the method further comprising, after performing the chemical mechanical polishing process:
   forming a stitched magnetic pole over the write pole;
   forming a non magnetic spacer layer over the stitched pole;
   depositing a non-magnetic trailing shield gap material; and
   depositing a magnetic trailing shield over the non-magnetic trailing shield gap material.

* * * * *